US008589649B2

(12) United States Patent
Maki et al.

(10) Patent No.: US 8,589,649 B2
(45) Date of Patent: *Nov. 19, 2013

(54) COMPUTER SYSTEM AND METHOD OF NOTIFYING ERROR INFORMATION OF THE COMPUTER SYSTEM

(71) Applicant: Hitachi, Ltd., Tokyo (JP)

(72) Inventors: Nobuhiro Maki, Yokohama (JP); Masahide Sato, Noda (JP); Katsuhisa Miyata, Yokohama (JP); Kenta Ninose, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,985

(22) Filed: Nov. 13, 2012

(65) Prior Publication Data

US 2013/0073805 A1 Mar. 21, 2013

Related U.S. Application Data

(63) Continuation of application No. 13/241,955, filed on Sep. 23, 2011, now Pat. No. 8,332,602.

(30) Foreign Application Priority Data

Aug. 8, 2005 (JP) .................................. 2005-229015

(51) Int. Cl.
*G06F 12/00* (2006.01)

(52) U.S. Cl.
USPC ..... 711/162; 711/114; 711/161; 711/E12.002

(58) Field of Classification Search
USPC ............................ 711/114, 161–162, E12.002
See application file for complete search history.

(56) References Cited

U.S. PATENT DOCUMENTS

| | | | |
|---|---|---|---|
| 5,572,659 A | 11/1996 | Iwasa et al. | |
| 5,692,155 A | 11/1997 | Iskiyan et al. | |
| 5,890,217 A | 3/1999 | Kabemoto et al. | |
| 6,353,878 B1 | 3/2002 | Dunham | |
| 6,493,796 B1 | 12/2002 | Arnon et al. | |
| 7,162,580 B2 | 1/2007 | Hosouchi et al. | |
| 7,243,196 B2 | 7/2007 | Uratani et al. | |
| 7,254,684 B2 | 8/2007 | Hiraiwa et al. | |
| 7,543,121 B2 | 6/2009 | Maki et al. | |
| 7,610,508 B2 | 10/2009 | Ohno et al. | |
| 8,055,863 B2 | 11/2011 | Maki et al. | |
| 2002/0152362 A1 | 10/2002 | Cochran | |
| 2004/0172509 A1 | 9/2004 | Takeda et al. | |

(Continued)

FOREIGN PATENT DOCUMENTS

| | | |
|---|---|---|
| JP | 2004030254 | 1/2004 |
| JP | 2005044199 | 2/2005 |

(Continued)

*Primary Examiner* — Jasmine Song
(74) *Attorney, Agent, or Firm* — Brundidge & Stanger, P.C.

(57) ABSTRACT

There is disclosed a data storage system used in a computer environment where there are plural host computers and plural storage array controllers. When a remote copy is made while assuring the order of writing across plural storage array controllers, one of the host computers gains copy information about all the storage array controllers associated with the remote copy as a representative. The representative one of the storage array controllers collects and stores copy statuses which are individually managed by the storage array controllers for which a remote copy is made. The host computer gains the copy statuses from the representative controller using an instruction to gain the copy statuses.

17 Claims, 18 Drawing Sheets

(56) References Cited

U.S. PATENT DOCUMENTS

| | | |
|---|---|---|
| 2004/0243892 A1 | 12/2004 | McBride et al. |
| 2005/0033828 A1 | 2/2005 | Watanabe |
| 2005/0050288 A1 | 3/2005 | Takahashi et al. |
| 2005/0114467 A1 | 5/2005 | Ikegaya et al. |
| 2005/0154829 A1 | 7/2005 | Maki et al. |
| 2006/0282617 A1 | 12/2006 | Nagasoe et al. |
| 2007/0033355 A1 | 2/2007 | Maki et al. |
| 2012/0017058 A1 | 1/2012 | Maki et al. |

FOREIGN PATENT DOCUMENTS

| | | |
|---|---|---|
| JP | 2005055948 | 3/2005 |
| JP | 2005165444 | 6/2005 |
| JP | 2005182130 | 7/2005 |
| JP | 2005182532 | 7/2005 |
| JP | 2005196618 | 7/2005 |
| JP | 2005202532 | 7/2005 |
| JP | 2005208906 | 8/2005 |

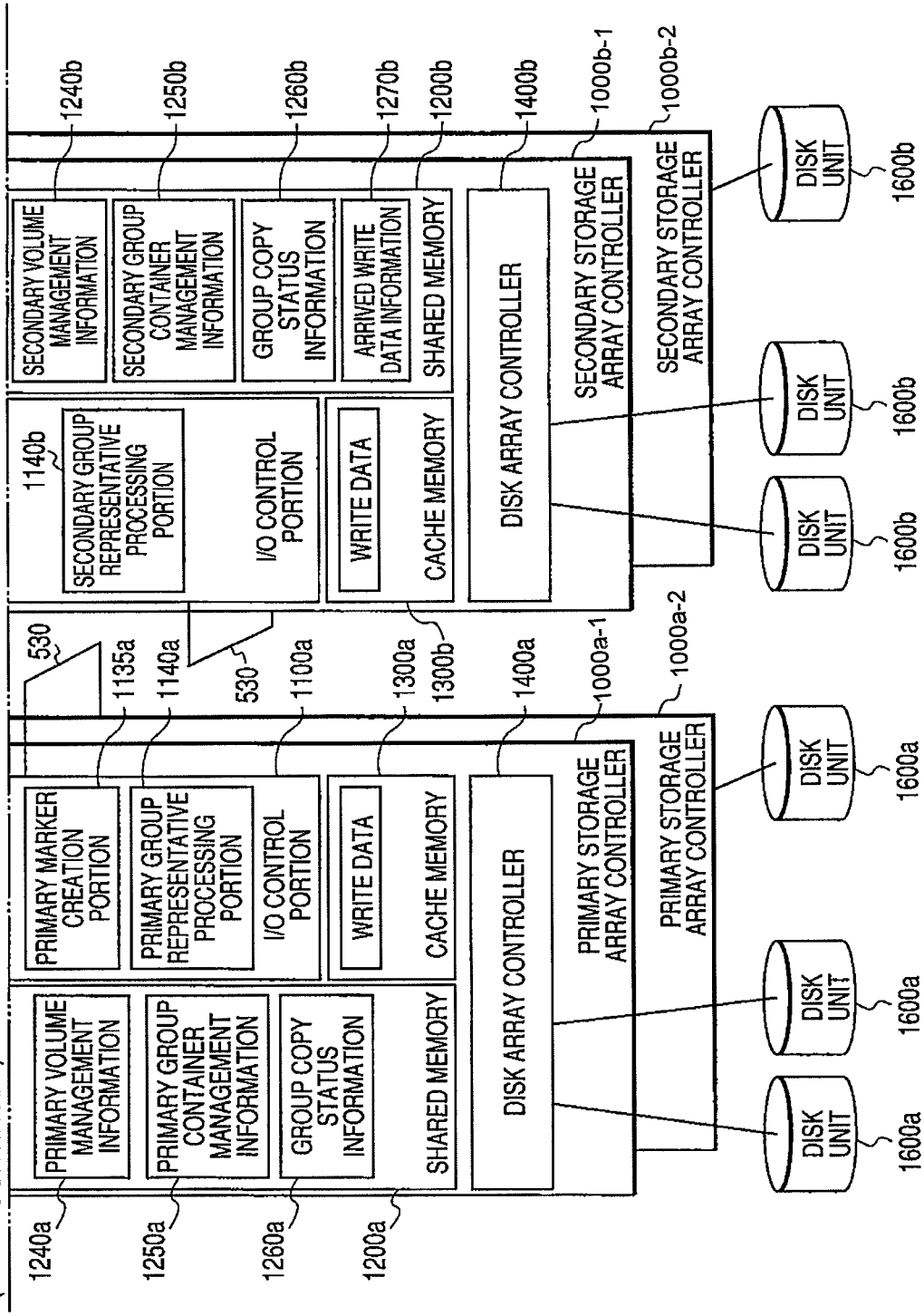

FIG. 4

GROUP MANAGEMENT INFORMATION 1210

| Field | Ref |
|---|---|
| GROUP ID | 2A |
| PRIMARY GROUP CONTAINER ID | 2B |
| SEQUENTIAL NUMBER | 2C |
| NUMBER OF LOGICAL VOLUMES | 2D |
| LOGICAL VOLUME ID | 2E |
| ⋮ | |
| LOGICAL VOLUME ID | 2E |
| REMOTE STORAGE ARRAY CONTROLLER ID | 2F |
| REMOTE GROUP ID | 2G |

FIG. 5

WRITE DATA MANAGEMENT INFORMATION 1220

| Field | Ref |
|---|---|
| LOGICAL VOLUME ID | 3A |
| WRITE ADDRESS | 3B |
| WRITE DATA LENGTH | 3C |
| WRITE DATA POINTER | 3D |
| SEQUENTIAL NUMBER | 3E |
| INTERVAL NUMBER | 3F |
| BITS NEED TO BE TRANSFERRED | 3G |

FIG. 6

GROUP COPY STATUS INFORMATION

| | |
|---|---|
| GROUP ID | 4A |
| NUMBER OF PAIRS IN GROUP | 4B |
| NUMBER OF PAIRS DURING COPY | 4C |
| NUMBER OF DUPLEXES PAIRS | 4D |
| NUMBER OF PAIRS IN SUSPENSION | 4E |
| NUMBER OF SUSPENDED PAIRS | 4F |
| NUMBER OF SUSPENDED PAIRS | 4G |
| ERROR/NO ERROR | 4H |
| TYPICAL ERROR CODE | 4I |

COPY PAIR MANAGEMENT INFORMATION 1230

| PRIMARY LOGICAL VOLUME ID | COPY STATUS | SECONDARY STORAGE ARRAY CONTROLLER ID | SECONDARY LOGICAL VOLUME ID | PRIMARY GROUP ID | PRIMARY GROUP CONTAINER ID |
|---|---|---|---|---|---|
| 5A | 5B | 5C | 5D | 5F | 5G |

FIG. 8

VOLUME MANAGEMENT INFORMATION 1240

| LOGICAL VOLUME ID | VOLUME STATUS | CAPACITY | PAIR ID | GROUP ID | GROUP CONTAINER ID |
|---|---|---|---|---|---|
| 6A | 6B | 6C | 6D | 6F | 6G |

ARRIVED WRITE DATA INFORMATION

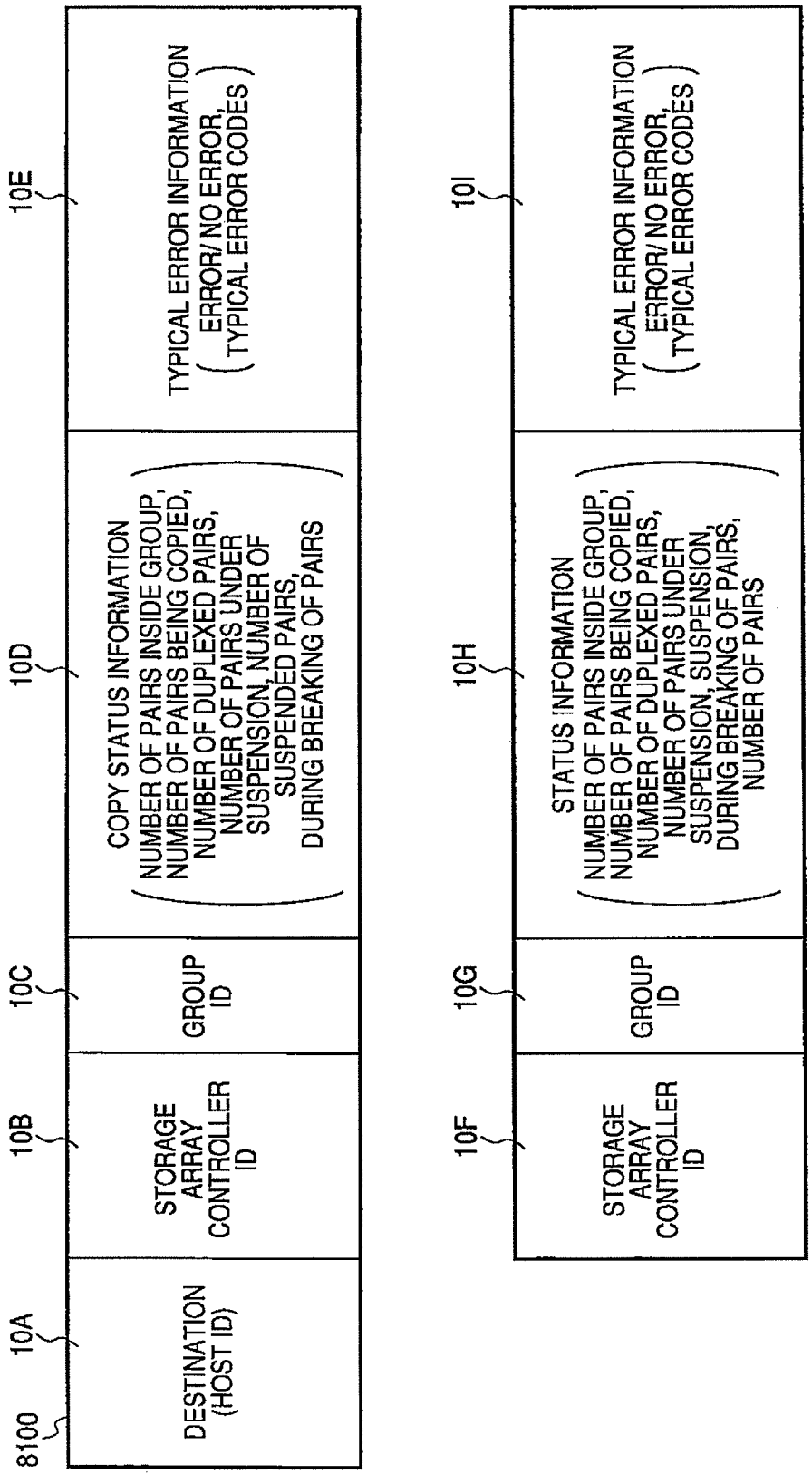

FIG. 18

| DECISION TABLE ON COPY STATUS OF GROUP CONTAINERS | CONTENTS OF STATUS TABLE | | | | | |
|---|---|---|---|---|---|---|
| | NUMBER OF PAIRS BEING COPIED | NUMBER OF DUPLEXED PAIRS | NUMBER OF PAIRS UNDER SUSPENSION | NUMBER OF PAIRS UNDER SUSPENSION | NUMBER OF PAIRS BEING BROKEN | ERROR/NO ERROR |
| INITIALIZATION | 0 | 0 | 0 | 0 | 0 | 0 |
| DURING COPY | OVER 1 AND UNDER NUMBER OF PAIRS | OVER 0 AND UNDER NUMBER OF PAIRS | 0 | 0 | 0 | 0 |
| DUPLEXING | 0 | NUMBER OF PAIRS | 0 | 0 | 0 | 0 |
| UNDER SUSPENSION | 0 | OVER 0 AND UNDER NUMBER OF PAIRS | OVER 1 AND UNDER NUMBER OF PAIRS | OVER 0 AND UNDER NUMBER OF PAIRS | 0 | 0 |
| SUSPENSION | 0 | 0 | 0 | NUMBER OF PAIRS | 0 | 0 |
| DURING BREAKING OF PAIRS | 0 | OVER 0 AND UNDER NUMBER OF PAIRS | 0 | OVER 0 AND UNDER NUMBER OF PAIRS | OVER 1 AND UNDER NUMBER OF PAIRS | 0 |
| ERROR | OVER 0 | OVER 0 | OVER 0 | OVER 0 | OVER 0 | 1 |

8200

COMPUTER SYSTEM AND METHOD OF NOTIFYING ERROR INFORMATION OF THE COMPUTER SYSTEM

The present application is a continuation of application Ser. No. 13/241,955, filed Sep. 23, 2011; which is a continuation of application Ser. No. 11/234,195, filed Sep. 26, 2005, now U.S. Pat. No. 8,055,863; which relates to and claims priority from Japanese Patent Application No. 2005-229015, filed on Aug. 8, 2005, the entire disclosure of which is incorporated herein by reference.

BACKGROUND OF THE INVENTION

The technique disclosed herein relates to data storage equipment and method of controlling it and, more particularly, to data storage equipment used in a remote copy environment in a computer system having a plurality of computers and a plurality of data storage units and to a method of controlling the data storage equipment.

As the amount of data has increased explosively, the number of host computers within a computer system and the capacities of storage systems tend to increase. Furthermore, in order to process a huge amount of data, plural host computers are often run in cooperation. One example of this is a computer system in which the results of processing performed by one host computer are input to and processed by another host computer.

Additionally, as businesses depend more on information processing systems and the amount of damage caused by lost of data increases to an enormous level, the importance of disaster recovery of the data increases.

Where duplication for disaster recovery of a computer system is carried out by the prior art technique, each host computer has instructed a storage system under control of the host computer itself to copy data for the host computer itself. The copy made by the storage system is controlled by the host computer that specifies the corresponding storage area of a copy-source storage system and the corresponding storage area of a copy-destination storage system.

In the technique disclosed in US2005/0154829A1, one host computer of a computer system performs a batch copy into arbitrary or whole storage area within data storage equipment in the computer system including plural host computers and a storage system. Specified ones of storage areas offered by the disk equipment are collectively defined as a group. A copy can be performed by specifying such a group. Each group is made up of an assemblage of subgroups. Subgroups are defined for each computer. The consistency of the order of copy operations among the computers is assured.

US2005/0114467A1 discloses a technique for gaining the status information about remote copy of a storage subsystem in a remote location by a host computer, the subsystem being not directly coupled to the host computer.

Where a primary storage system for storing data to be written (hereinafter may be referred to as "write data") from a host computer is different among different host computers, a certain one host computer has not collected the status of the primary storage area possessed by each primary storage system or the status of a pair formed by a secondary storage area of a secondary storage system and a primary storage area. Therefore, the status of the whole computer system has not been managed efficiently.

SUMMARY OF THE INVENTION

One aspect of the present invention has been made to solve the foregoing problem and provides a computer system having plural host computers, plural primary storage systems for storing write data from the host computers, and secondary storage systems for storing copy of the write data. A certain one of the primary storage systems collects information about the statuses of the primary storage areas of plural primary storage systems and notifies the collected status information to an arbitrary one of the host computers.

The status information may include the status of a secondary storage area forming a pair with a primary storage area, the status of communication between the primary and secondary storage areas, and the status of a copy. Where previously specified plural pairs are managed as a group, the unit of the information collected may be each individual group.

According to this one aspect of the invention, one unit of storage equipment controls copies over the whole computer system across plural units of storage equipment, the computer system having plural host computers and plural units of storage equipment. The one unit of storage equipment can gain the status of the copies.

BRIEF DESCRIPTION OF THE DRAWINGS

FIG. 4 is a diagram showing an example of format of group management information.

FIG. 5 is a diagram showing an example of format of write data management information.

FIG. 6 is a diagram showing an example of format of group copy status information.

FIG. 7 is a diagram showing an example of format of copy pair management information.

FIG. 8 is a diagram showing an example of format of volume management information.

FIG. 17 is a diagram showing one example of format of report of group container copy status information included in an instruction for storage control.

FIG. 18 is a table showing one example of decision table on copy status of groups.

DESCRIPTION OF THE PREFERRED EMBODIMENTS

Embodiments of the present invention are hereinafter described. It is to be noted that the present invention is not limited to the embodiments described below.

Figure 1:
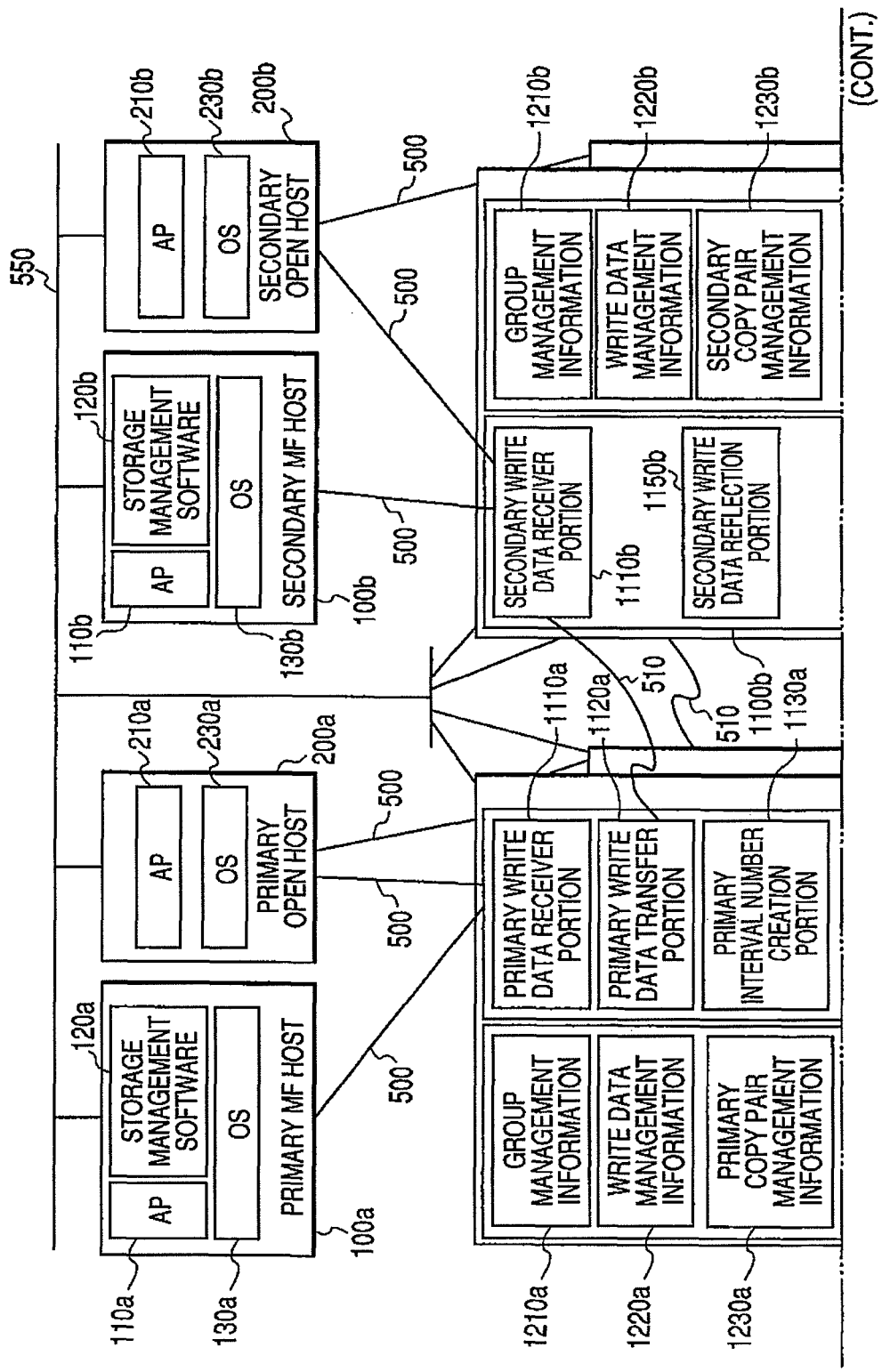
FIG. 1 is a block diagram showing an example of configuration of a computer system according to one embodiment of the present invention.

FIG. 1 shows an example of structure of a computer system according to one embodiment of the present invention. The computer system has one or more primary mainframe hosts 100a (hereinafter may be abbreviated MF hosts), one or more primary OPEN system hosts 200a (hereinafter may be abbreviated OPEN hosts), a plurality of primary storage array controllers 1000a-1, 1000a-2 (referred to hereinafter as 1000a), one or more secondary mainframe hosts 100b, one or more secondary OPEN system hosts 200b, and a plurality of second storage array controllers 1000b-1, 1000b-2 (referred to hereinafter as 1000b).

The primary storage array controllers 1000a, primary MF hosts 100a, and primary OPEN hosts 200a are connected by communication paths 500. Note that the primary OPEN hosts and primary MF hosts 100a are not always connected with all the primary storage array controllers 1000a. Similarly, the secondary storage array controllers 1000b, secondary MF hosts 100b, and secondary OPEN hosts 200b are connected by communication paths 500. Normally, the secondary MF hosts 100b and secondary OPEN hosts 200b are in standby mode. The primary MF hosts 100a, secondary MF hosts 100b, primary OPEN hosts 200a, and secondary OPEN hosts 200b are also connected with a control network 550.

The primary MF hosts 100a and secondary MF hosts 100b are computers each of which has a processor, a memory, and an I/O control portion (none of which are shown). They are connected by an internal network. An OS (operating system) 130, application programs (APs) 110, and storage management software 120 are stored in the memory. These are executed by the processors possessed by the primary MF hosts 100a and secondary MF hosts 100b. Also, each of the primary OPEN hosts 200a and secondary OPEN hosts 200b is a computer having a processor, a memory, and an I/O control portion (none of which are shown) in the same way as the MF hosts. These are connected by an internal network. An OS (operating system) 230 and APs 220 are stored in the memory. These are executed by the processors possessed by the primary OPEN host 200a and secondary OPEN host 200b.

I/O requests issued from the APs and storage management software in the primary MF hosts 100a, secondary MF hosts 100b, primary OPEN hosts 200a, and secondary OPEN hosts 200b via the OS are processed by the primary storage array controllers 1000a and secondary storage array controllers 1000b via the communication paths 500.

Each of the primary storage array controllers 1000a has I/O control portion 1100a, shared memory 1200a, cache 1300a, disk array controller 1400a, and one or more disk units 1600a. These are internally connected by a network. The I/O control portion 1100a can execute various kinds of programs for primary write data receiver portion 1110a, primary write data transfer portion 1120a, primary interval number creation portion 1130a, and primary marker creation portion 1135a. The I/O control portion 1100a of one of the primary storage array controllers 1000a executes various programs and controls exchange of data with the outside via communication lines. A primary group representative processing portion 1140a is a program stored in the shared memory 1200a. The I/O control portion 1100a reads this program from the shared memory and executes it.

Information required in processing executed by the I/O control portion includes group management information 1210a, write data management information 1220a, primary copy pair management information 1230a, primary volume management information 1240a, primary group container management information 1250a, and group copy status information 1260a. These kinds of information are stored in the shared memory 1200a.

The cache 1300a is a high-speed memory for principally loading read data (data to be read) and write data. Use of the cache 1300a permits achievement of high I/O processing performance.

The disk array controller 1400a performs processing for offering one or more disk units 1600a as logical storage resources (hereinafter referred to as the logical volumes). Furthermore, according to the need, the disk array controller 1400a performs processing for transferring read data and write data between the cache 1300a and each disk unit 1600a.

The disk unit 1600a is a physical data storage unit such as a HDD. The disk unit 1600a writes and reads data according to I/O instructions from the disk array controller.

Each of the secondary storage array controllers 1000b also has an I/O control portion 1100b, a shared memory 1200b, a cache 1300b, a disk array controller 1400b, and one or more disk units 1600b. These are internally connected by a network. The I/O control portion 1100b executes programs for a secondary write data receiver portion 1110b and a secondary write data reflection portion 1150b. The I/O control portion 1100b of one of the secondary storage array controllers 1000b executes the secondary group representative processing portion 1140b, which is a program stored in the shared memory 1200b. The I/O control portion 1100b reads the program from the shared memory and executes it.

Group management information 1210b, write data management information 1220b, secondary copy pair management information 1230b, secondary volume management information 1240b, secondary group container management information 1250b, and group copy status information 1260b which are used by the I/O control portion 1100b are stored in the shared memory 1200b.

The cache memory 1300b, disk array controller 1400b, and disk units 1600b play the same roles as the aforementioned primary storage array controllers 1000a.

The plural primary storage array controllers 1000a and the plural secondary storage array controllers 1000b are connected by communication paths 510. The primary storage array controllers 1000a are interconnected by communication paths 530. Also, the secondary storage array controllers are interconnected by communication paths 530. A system equipped with the primary storage array controllers 1000a and disk units 1600a is referred to as a primary storage system. A system equipped with the secondary storage array controllers 1000b and disk units 1600b is referred to as a secondary storage system.

Figure 19:
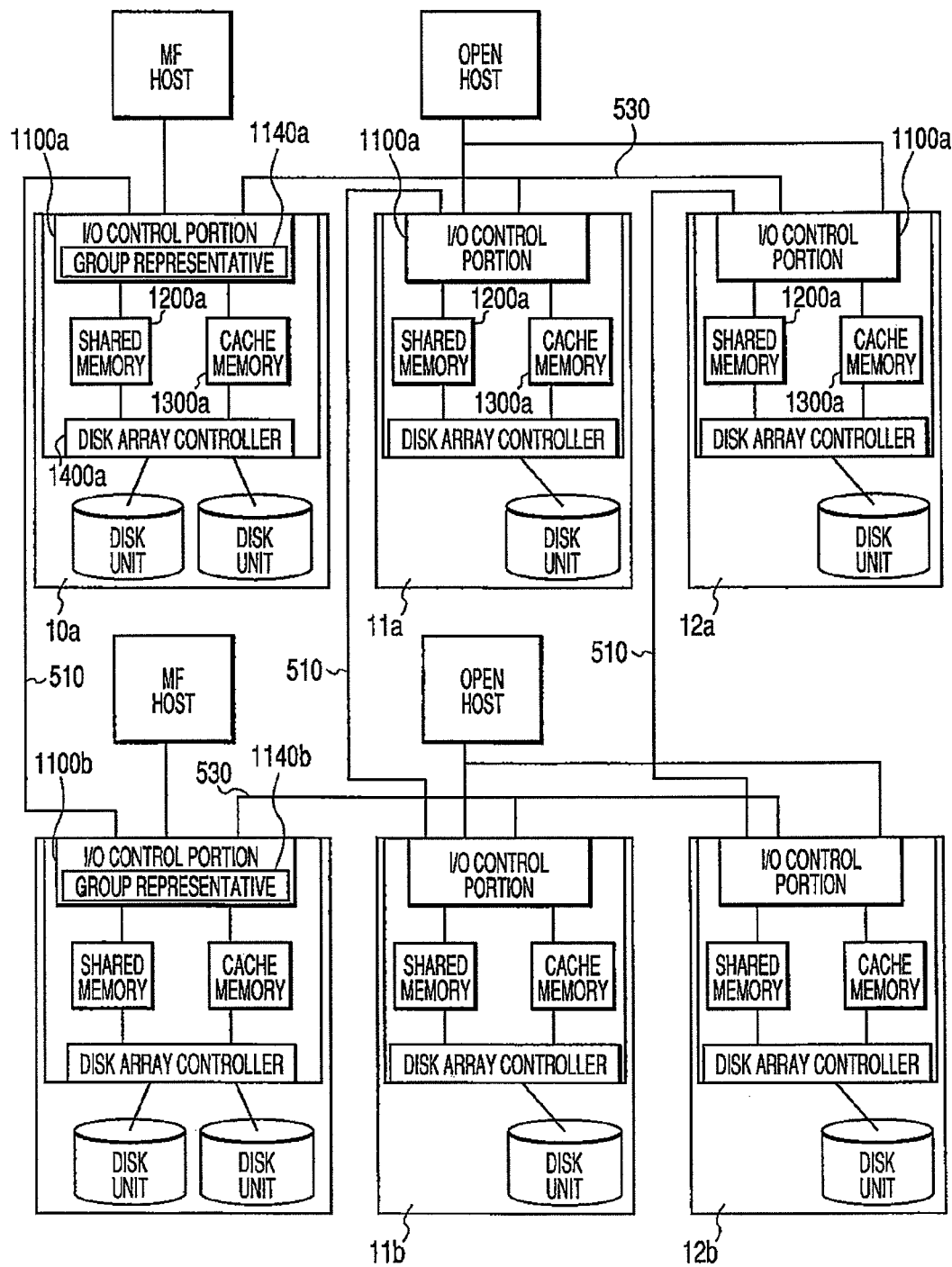
FIG. 19 is a diagram showing one example of hardware architecture of plural storage array controllers.

FIG. 19 shows an example of configuration of the hardware. Each of primary storage systems 10a, 11a, and 12a has a primary storage array controller and disk units. The primary storage systems 10a, 11a, and 12a are connected by communication paths 530.

Similarly, each of secondary storage systems 10b, 11b, and 12b has a secondary array storage controller and disk units. The secondary storage systems 10b, 11b, and 12b are connected by communication paths 530.

Each of the primary storage array controllers 1000a has I/O control portion 1100a, shared memory 1200a, cache 1300a, disk array controller 1400a, and one or more disk units 1600a. These are internally connected by a network. Similarly, each of the secondary storage array controllers 1000b has I/O control portion 1100b, shared memory 1200b, cache 1300b, disk array controller 1400b, and one or more disk units 1600b. These are internally connected by a network.

As described previously, the primary group representative processing portion 1140a is present in one of the primary storage array controllers 1000a. Similarly, the secondary group representative processing portion 1140b exists in one of the secondary storage array controllers 1000b. One primary group representative processing portion 1140a exists for one remote copy using a group container. Accordingly, where the remote copy using the group container operates within plural computer systems, the primary group representative processing portion 1140 aoperates in response to the number of computer systems in which the remote copy operates.

The operation of the remote copy performed between the storage array controllers is briefly described. As an example, a case in which one primary MF host 100a issues a write I/O request to one primary storage array controller 1000a is now considered. When the write I/O request issued by the primary MF host 100a arrives at the primary storage array controller 1000a, write data contained in the I/O request is stored in the logical volume of the primary storage array controller 1000a. Where the I/O request is a writing operation into a previously registered logical volume, the primary storage array controller 1000a performs a remote copy of the write data. The remote copy is a procedure for causing write data to be written into a certain logical volume of the primary storage array controller 1000a to be remotely duplicated into a certain logical volume within a secondary storage array controller 1000b. A combination of a volume from which a remote copy is transferred and a volume to which the write data is to be transferred is referred to as a copy pair.

Figure 2:
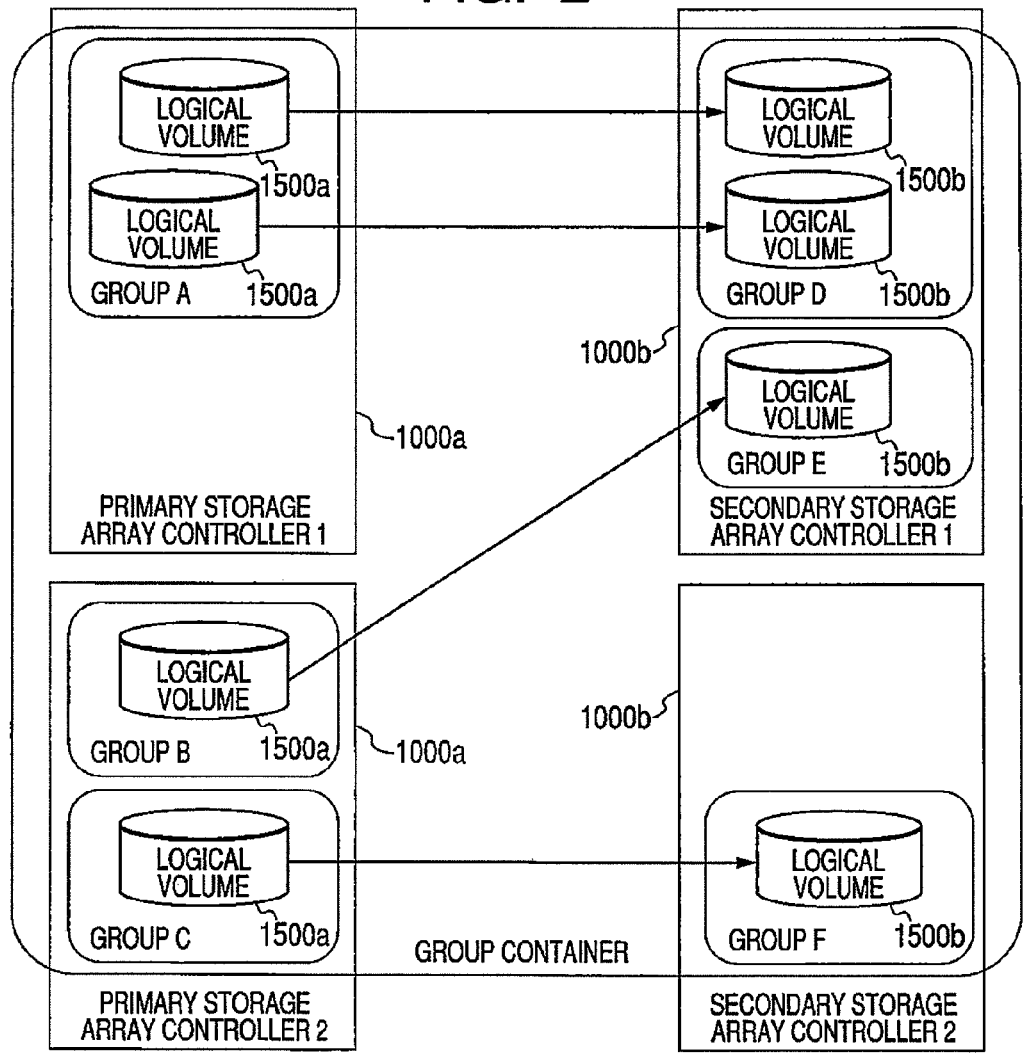
FIG. 2 is a diagram showing copy pair, groups, and group container of remote copy.

In the present embodiment, there are plural copy pairs between the primary storage array controllers 1000a and the secondary storage array controller 1000b. Certain copy pairs are organized into a group. Examples of groups of remote copies are conceptually illustrated in FIG. 2. In FIG. 2, groups A, B, and C are present in the primary storage array controllers 1000a. Groups D, E, and F are present in the secondary storage array controller 1000b. One or more logical volumes 1500 are present within a storage array controller in each group. The arrows between the volumes 1500 indicate the corresponding relations of copy pairs among the groups. That is, the group A that is a copy source has a copy pair relationship with the group D to which a copy will be transferred. Similarly, the groups B and E have a copy pair relationship. The groups C and F have a copy pair relationship. In the present embodiment, the order of write data sets received by the primary storage array controllers 1000a, transfer of write data from the primary storage array controllers 1000a to the secondary storage array controllers 1000b, and reflection of write data in volumes in the secondary storage array controllers 1000b are managed in units of groups. Resources necessary for such processing are assigned.

Control of remote copies in units of groups makes it unnecessary to provide control in units of a large number of copy pairs. Hence, copy control is facilitated. Furthermore, only copy pairs complying with businesses and users' demands can be organized into a group. Consequently, unnecessary remote copy of logical volumes 1500 will not be performed. The MF host 100 and the OPEN host 200 are different in performance requirement for the logical volumes 1500. Therefore, they are classified into different groups and processed differently. Also, users manipulations in response to processing and setting of tuning conditions are accepted differently.

In the remote copy of the embodiment of the invention, a group container capable of remote batch copy control of plural groups is present in each storage array controller. The use of the group container capable of batch control of plural groups permits remote copy control over plural storage array controllers beyond the frame set by the aforementioned groups within which the range of control is limited to logical volumes inside storage array controllers. For example, in FIG. 2, groups A, B, and C that are copy sources are present in the group container. Furthermore, groups D, E, and F that are copy destinations are present in the group container. Use of the group container enables batch copy of plural groups from the copy source to the copy destination.

One example of use of the group container is a case where a business is carried out by cooperation of plural hosts such as MF host 100 and OPEN host 200. For instance, a case is now discussed in which a database is offered using a logical volume of one storage array controller with an MF host and WEB services are offered with an OPEN host using a logical volume in a storage array controller different from the above-described storage array controller. The OPEN host provides the WEB services according to a request from a client computer. With the WEB services, data registered in the database might be necessary. In this case, the OPEN host makes an inquiry to the database operating on the MF host. In response to the inquiry from the OPEN host, the MF host processes the database and gives notice of data indicating the results to the OPEN host. The OPEN host provides services to the client computer of the request source utilizing the data from the MF host. Different application programs operate between the MF host and OPEN host. However, one application program needs data created by the other application program. Therefore, it is desired that archival information (such as log of operations, data produced by processing, and other write data necessary for the application program for disaster recovery) for each application program be transferred to the secondary storage array controller in a batch.

Furthermore, according to the present embodiment, remote copies are performed such that the order relationship of write data sets corresponding to the groups in the primary storage array controller 1000a is assured by the secondary storage array controller 1000b within a group and group container. When the remote copies are performed as described above, if the order relationship of the sets of write data is assured, it is said that the write data has consistency. Remote copies capable of assuring the order of writing operations between logical volumes belonging to the corresponding group in the storage array controller are achieved using a group. In addition, where a group container is used, remote copies assuring the order of writing operations between logical volumes across storage array controllers 1000 within the group container is achieved. By assuring consistency of sets of write data within a group, recovery from the secondary storage array controller is enabled, for example, with the database that permits processing across plural volumes within the storage array controller.

In an example of processing of a distributed database involving processing across logical volumes of plural storage array controllers or the above-described cooperative operations of MF and OPEN hosts, if business data is transferred to a secondary storage array controller with remote copy, recovery of business is enabled by assuring the consistency of sets of write data within the group container and by causing the secondary host to use the data transferred to the secondary storage array controller. Since the order in which sets of write data received by the primary storage array controller are written is the same as the order used by the secondary storage array controller, the recovery procedure from the secondary storage array controller is the same as the recovery procedure of the primary storage array controller when a fault occurs with it. In a business where the MF and OPEN hosts cooperate and no group container is used, if data written into the primary storage array controller 1000a by the MF host cannot be transferred due to a fault with the communication line, the data written by the OPEN host is transferred to the secondary storage array controller 1000b unless a fault occurs with the communication lines for the primary storage array controller 1000a and secondary array controller 1000b connected with the OPEN host. If the primary storage array controller 1000a is hit by a disaster and if recovery is attempted from the secondary host, the order in which data sets are written is different between the individual secondary storage array controllers 1000b and so data necessary for the application program may not be transferred correctly. Hence, recovery of the business may not be done.

Figure 3:
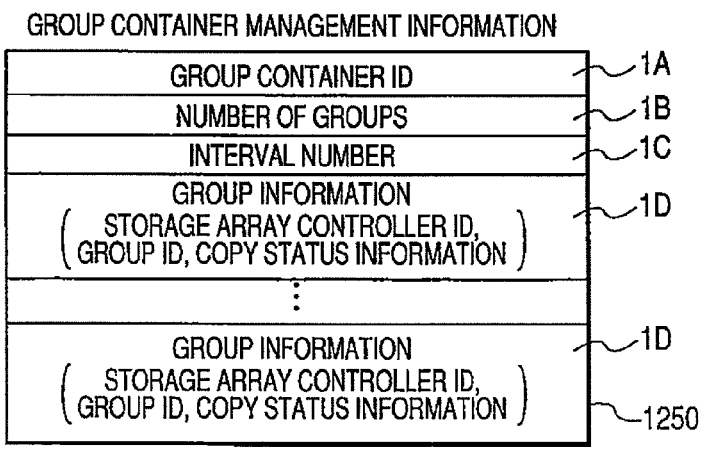
FIG. 3 is a diagram showing an example of format of group container management information.

One example of the format of the primary group container management information 1250a is shown in FIG. 3. This management information 1250a includes group container ID (1A), number of groups (1B), interval number (1C), and group information (1D). The group container ID (1A) is an ID for identifying a group container between primary and secondary storage array controllers. The number of groups (1B) indicates the total number of groups existing in the group container. The interval number (1C) is a number indicating a time interval of remote copy. The group information (1D) includes storage array controller ID for identifying the storage array controller and the ID of the group existing in the controller, as well as copy status. The primary group container management information 1250a is obtained by gaining information having the group container ID coincident with the group container ID (5G) in the copy pair management information 1230a that is found to be coincident in step 5020.

One example of format of the group management information is shown in FIG. 4. The group management information 1210a includes group ID (2A), group container ID (2B), sequential number (2C), number of logical volumes (2D), logical volumes (2E), remote storage array controller ID (2G), and remote group ID (2H). The group ID (2A) is used to identify the groups within the primary storage array controller 1000a. The group container ID (2B) is an ID for identifying a group container between the primary and secondary storage array controllers. The sequential number (2C) is a number for assuring the order in which sets of write data within the group are written. In particular, sequential numbers are sequentially given to sets of write data to be written into logical volumes 1500a belonging to the corresponding groups, the write data sets being received by the primary storage array controller 1000a from the MF host 100 and OPEN host 200. The values of the number are stored in the group management information 1210a. For example, the initial value is 0, and the value is incremented by one at a time. The number of logical volumes (2D) is the total number of logical volumes 1500 existing in the corresponding group. The volume ID is the ID of a volume existing in the group. The remote storage array controller ID (2G) is the ID of the secondary storage array controller 1000b of a copy destination and makes a pair with the primary storage array controller 1000a in remote copy. The remote group ID (2H) is an ID for identifying the group to which the logical volume of the copy destination belongs in the remote storage array controller ID.

The secondary storage array controller 1000b has group management information 1260b. This item is also similar to the group management information 1260b of the primary storage array controller 1000a. However, the group ID of the group management information 1260b is an ID for identifying the group to which the logical volume 1500 of the copy destination belongs. The remote storage array controller ID is an ID for identifying the primary storage array controller 1000a having the logical volume of the copy destination. The remote group ID is an ID for identifying the group to which the logical volume of the copy destination in the primary storage array controller 1000a indicated by the remote storage unit ID belongs.

One example of the write data management information 1220a is shown in FIG. 5. This information includes information referenced by the secondary storage array controller when a copy of data stored in the logical volume of the transfer source is stored in the logical volume of the transfer destination. The write data management information 1220a includes logical volume ID (3A), write address (3B), write data length (3C), write data pointer (3D), sequential number (3E), interval number (3F), and bit (3G) need to be transferred. The logical volume ID (3A) is an ID for identifying the write destination volume for the write data. The write address (3B) is a write address on a logical volume into which the write data is to be written. The write data length (3C) is the data size of the write data. The bit (3G) need to be transferred indicates whether there is a remote copy target.

The contents of the write data management information 1220b in the secondary storage array controller 1000b are the same as the contents of the write data management information 1220a in the primary storage array controller but different from the write data management information held in the primary storage array controller 1000a in the following respects. With respect to the write data management information 1220b stored in the shared memory 1200b of the secondary storage array controller 1000b, the logical volume ID is the ID of the volume 1500 of the copy destination. The write data pointer is the start address of write data in the cache memory 1300b of the secondary storage array controller 1000b. The transfer need bit assumes a bit indicating no transfer.

One example of the format of the group copy status information 1260a is shown in FIG. 6. The group copy status information is an information table in which the status of each copy pair registered in the group is indicated by the number of pairs of each copy status. The group copy status information 1260a includes group ID (4A), number of pairs inside a group (4B), number of pairs being copied (4C), number of duplexed pairs (4D), number of pairs under suspension (4E), number of suspended pairs (4F), number of pairs being broken (4G), error/no error (4H), and typical error codes (4I). The group ID (4A) is an ID for identifying a group within the primary storage array controller 1000*a*. The number of pairs inside a group (4B) indicates the total number of copy pairs contained in the group indicated by the group ID. The number of pairs being copied (4C) indicates the total number of copy pairs in a state of initial copy within the group, the state being one status of remote copy. The number of duplexed pairs (4D) is one of statuses of remote copy and indicates the total number of copy pairs in duplexed state within the group. The number of pairs under suspension (4E) is one of statuses of remote copy and indicates the total number of copy pairs under suspension within the group. The number of suspended pairs (4F) is one of statuses of remote copy and indicates the total number of copy pairs in suspended status within the group. The number of pairs being broken (4G) is one of statuses of remote copy and indicates the total number of copy pairs currently being broken within the group. In the error/no error (4H), a bit indicating occurrence of an error is recorded in the information if the error occurs during copy. The typical error code (4I) is information set when the error bit indicates the presence of an error. An error code is entered in this typical error code. The method of using the group copy status information 1260*a* is described in detail later.

Figure 20:
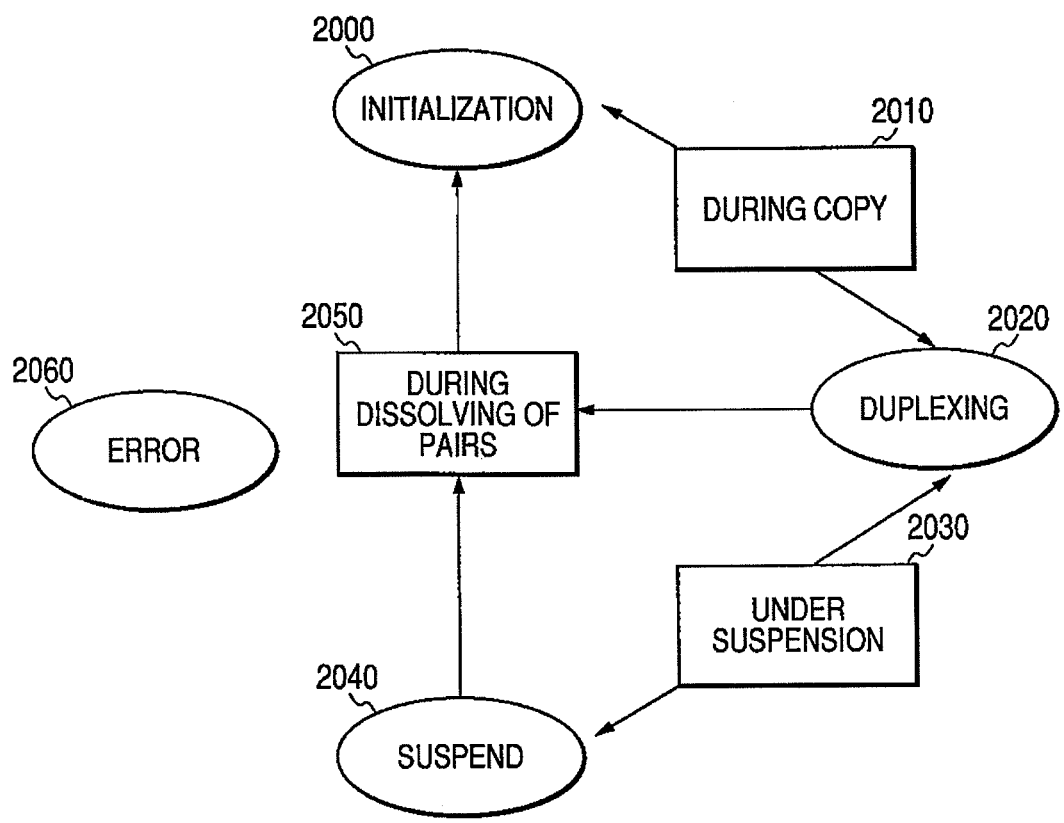
FIG. 20 is a diagram showing one example of copy status transition.

A table of transitions between copy statuses is shown in FIG. 20. Seven statuses exist in copy pairs: initial, during copy, duplexed, under suspension, suspended, pair being broken, and error. The initial status 2000 is a status in which copy is not started. The during copy status 2010 is a status of initial copy. The initial copy indicates a transient state in which the contents of a volume of a copy source of a copy pair have not been yet completely transferred to a volume of a copy destination. The contents are not coincident between the copy destination and the copy source. This is a status that makes a transition immediately after the start of a copy. The duplexed status 2020 is a status in which the contents of a volume of a copy source of a copy pair have been completely transferred to a volume of a copy destination. After duplexed transition, data transfer is effected only when write data directed at the corresponding volume of the primary storage array controller 1000*a* is received. Under suspension status 2030 is a transient status in which a copy is being temporarily stopped. Suspended status 2040 is a status in which a copy has been temporarily stopped. If a transition is made to this status, write data is temporarily stored in the primary storage array controller 1000*a* of a copy source. On the other hand, when the copy is resumed, the write data stored in the primary storage array controller is transferred to the secondary storage array controller 1000*b*. This status of transfer also assumes under suspension status 2030. During dissolving of pair status 2050 is a transient status occurring when a copy is ended. The error/no error status 2060 makes a transition when a fault occurs during copy.

The arrows indicate the directions of transitions. A circle indicates a steady state. A square indicates a transient state. For example, a transition to the during dissolving of pair status 2050 can be made either from the suspended status or from the duplexed status 2030. Since there is a possibility that a transition is made to the error/no error status 2060 from any status and so the directions of transitions are not shown.

An example of format of copy pair management information 1230*a* is shown in FIG. 7. The copy pair management information 1230*a* includes primary logical volume ID (5A), copy status (5B), secondary storage array controller ID (5C), secondary logical volume ID (5D), group ID (5F), and group container ID (5G). The primary logical volume ID (5A) is an ID for identifying a logical volume of a copy source on a primary storage array controller. The copy status (5B) indicates the manner how a copy is being processed. The secondary storage array controller ID (5C) is an ID for identifying a secondary storage array controller of a copy destination. The secondary logical volume ID (5D) is an ID for identifying a logical volume of a copy destination on the secondary storage array controller. The positive group ID (5F) is an ID for identifying a copy group of a primary storage array controller 1000*a* to which a copy pair belongs. The group container (5G) is an ID for identifying a group container for combining groups of original and copy of the primary and secondary storage array controllers into one.

Copy pair information about all remote copies operating on the reserved storage array controller 1000*a* is described in the copy pair management information 1230*a*.

The secondary storage array controller 1000*b* also has copy pair management information. This item is also similar to that of the primary storage array controller 1000*a*.

An example of format of volume management information 1240*a* is shown in FIG. 8. The volume management information 1240*a* is information used by the primary storage array controller 1000*a* to manage the statuses of all the volumes within the primary storage array controller. The volume management information 1240*a* includes logical volume ID (6A), volume status (6B), capacity (6C), pair ID (6D), group ID (6F), and group container ID (6G). The logical volume ID (6A) is an ID for identifying a logical volume of a copy source on the primary storage array controller. The volume status (6B) indicates the status of a volume and assumes a value of any one of normal, primary, secondary, abnormal, and unused statuses. Where the status of a volume is normal or primary, it means that the primary MF host 100*a* or primary OPEN host 200*a* can have a normal access to the logical volume. Furthermore, where the status of the volume is primary, it means that the volume is a logical volume of the copy source. Where the status of the volume is secondary, it means that the volume is a logical volume of a copy destination. Where the status of the volume is abnormal, it means that either primary MF host 100*a* or primary OPEN host 200*a* cannot have a normal access to the logical volume. For example, this is an obstruction due to a fault with the disk unit 1600*a* having a logical volume. Where the status of a volume is the unused status, it means that the logical volume is not in use. The pair ID (6D) indicates an ID for identifying a pair. The group ID (6F) is an ID for identifying a group in a primary storage array controller 1000*a* within a group container. The group container ID (6G) is an ID for identifying the group container.

The secondary storage array controller 1000*b* also has volume management information 1240*b* that is similar to the information held in the primary storage array controller 1000*a*.

The operation of remote copy using the group container is next described.

Figure 9:
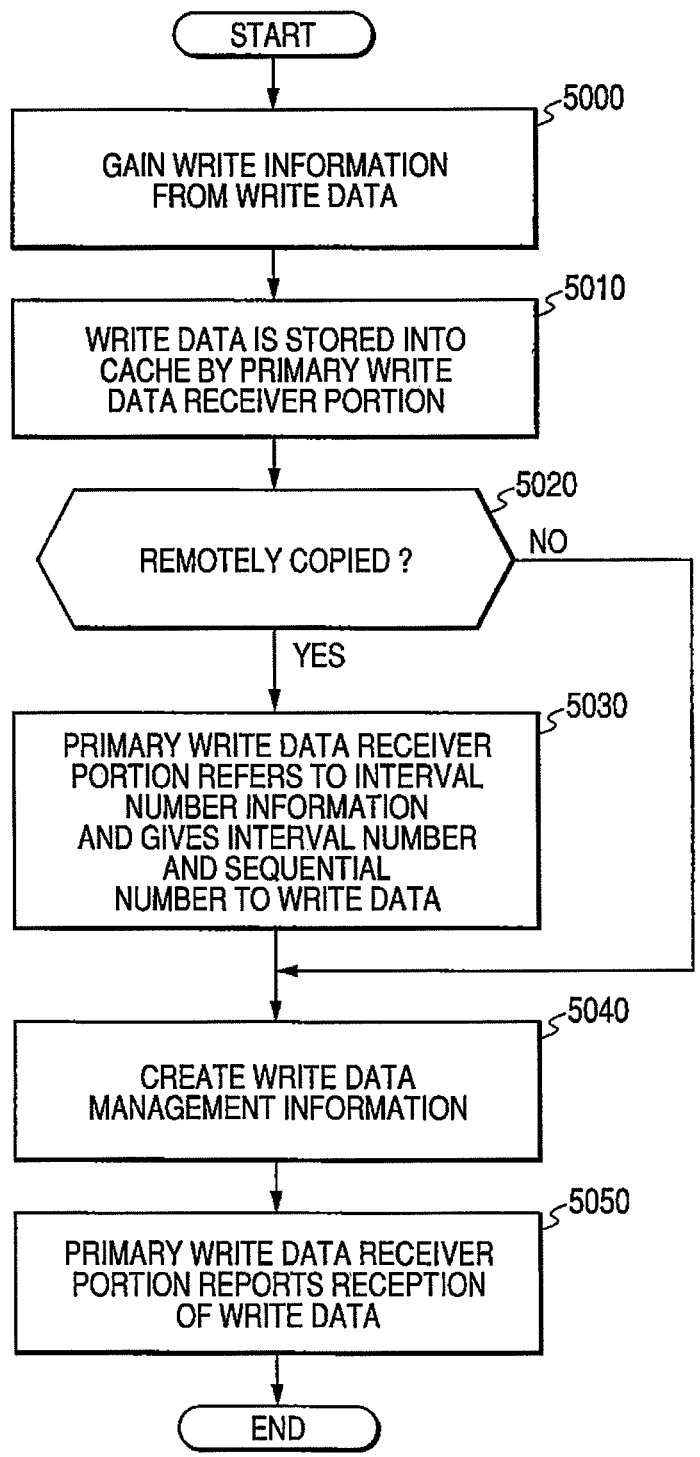
FIG. 9 is a flowchart illustrating one example of processing performed in a case where a primary storage array controller has received from a host a write I/O request to a logical volume acting as a copy source of a remote copy.

FIG. 9 shows an example of processing performed in a case where a write I/O request to the logical volume 1500*a* that will be a copy source of remote copy is received by the primary storage array controller 1000*a* from either primary MF host 100*a* or primary OPEN host 200*a*.

The primary write data receiver portion 1110*a* of the primary storage array controller 1000*a* receives the write I/O request via the communication path 500, the request being issued by the MF host or OPEN host. The primary write data receiver portion 1110*a* analyzes the received write I/O request and gains the logical volume ID of the write destination, write address, write data length, and write data (step 5000).

The primary write data receiver portion 1110*a* stores the gained write data into the cache memory 1300*a* (step 5010).

Furthermore, the primary write data receiver portion 1110*a* refers to copy pair management information 1230*a* stored in the shared memory 1200*a*.

The primary write data receiver portion 1110*a* then compares the contents of the primary logical volume ID (5A) of the management information with the logical volume ID of the write destination of the received write I/O request (S5020). If the result of the comparison indicates that the primary logical volume ID (5A) of the copy pair management information and the logical volume ID of the write destination of the received write I/O request agree (YES at 5020), the received write I/O request is a subject of remote copy.

Where the received write I/O request is a remote copy subject, the primary write data receiver portion 1110*a* gives the interval number and the sequential number to the aforementioned write data (step 5030). The interval number is used to assure the order of writing of transferred data sets in remote copy to be performed across plural units or across plural groups. The interval number is described in detail later. The sequential number is used to assure the order of writing of write data sets inside a group.

The primary write data receiver portion 1110*a* refers to the primary group container management information 1250*a* in the shared memory 1200*a* to gain interval number information. Furthermore, the primary write data receiver portion 1110*a* refers to the group management information 1210*a* in the shared memory 1200*a* to gain the sequential number. The primary write data receiver portion 1110*a* gains the group management information having the same group ID from the group management information 1210*a* as the group ID (5F) of the copy pair management information 1230*a* found to be coincident in step 5020. The interval number and sequential number obtained by the procedure described so far are given to the write data (S5030).

After the step 5030 or in a case where the primary logical volume ID (5A) of the copy pair management information 1230*a* and the logical volume ID of the write destination of the received write I/O request are not coincident (NO in 5020), the primary write data receiver portion 1110*a* creates write data management information 1220*a*, using the interval number obtained in step 5030, a sequential number obtained by adding 1 to the sequential number, information (logical volume ID of the write destination, write address, and write data length) obtained in step 5000, and a write data pointer obtained when the write data is stored into the cache memory in step 5010 (step 5040).

In step 5030, the primary write data receiver portion 1110*a* sets a bit to the transfer need bit (3G) of the write data management information 1220*a* to indicate transfer.

Finally, the write data receiver portion 1110*a* reports completion of writing to the MF host 100*a* or to the OPEN host 200*a* (step 5050).

As described so far, the storage array controller 1000 involves neither writing into a physical disk, which is generally said to take a long time from the instant when an I/O request from a host is received to the instant when report of the completion is sent back to the host, nor transfer to other storage array controller. These processing steps are carried out at appropriate timings and asynchronously. Accordingly, the I/O request from the MF host or OPEN host can be completed in a short time.

Figure 10:
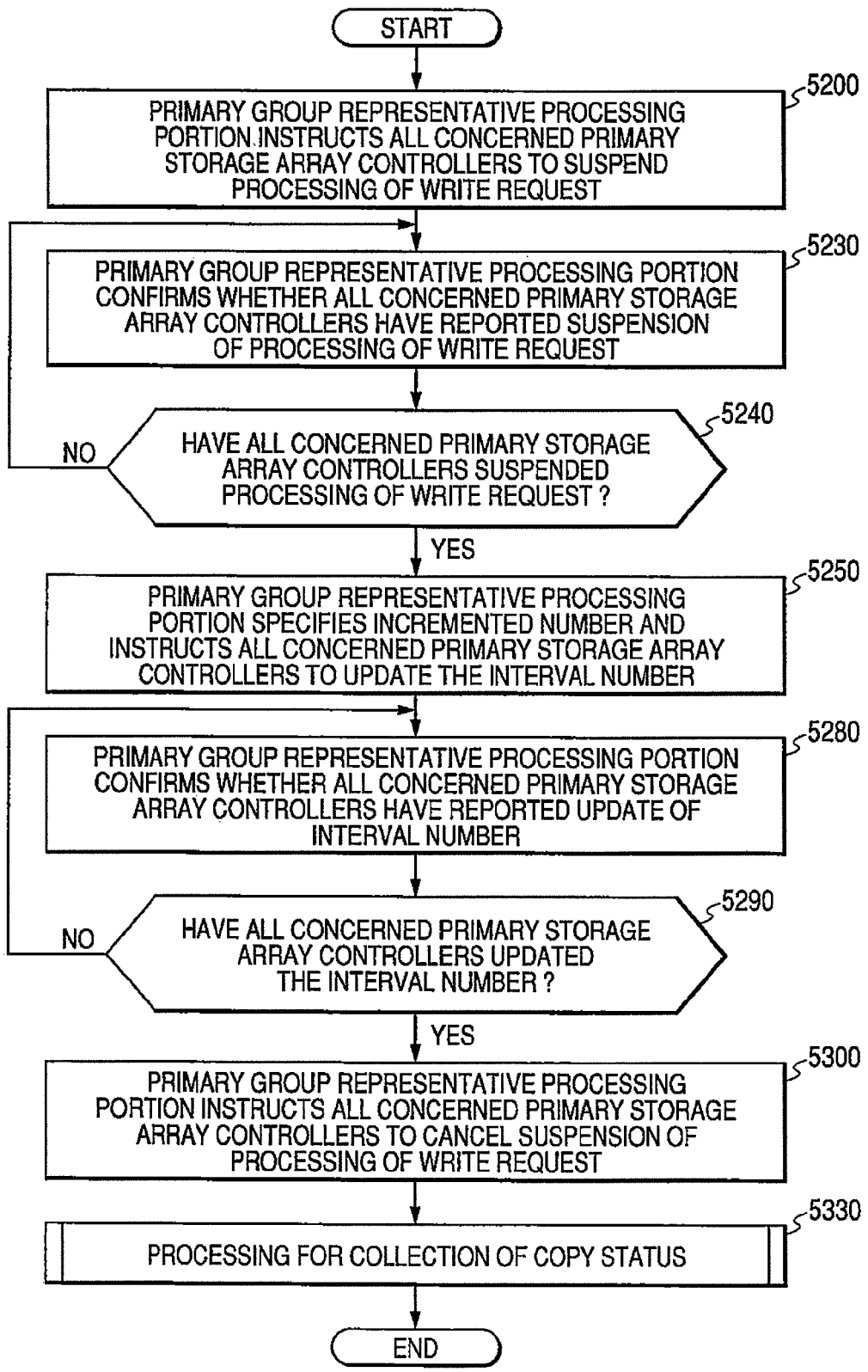
FIG. 10 is a flowchart illustrating one example of processing in which a group representative processing portion instructs a primary storage array controller 1000a-1, 1000a-2 to suspend processing of a write request and to update an interval number.
Figure 21:
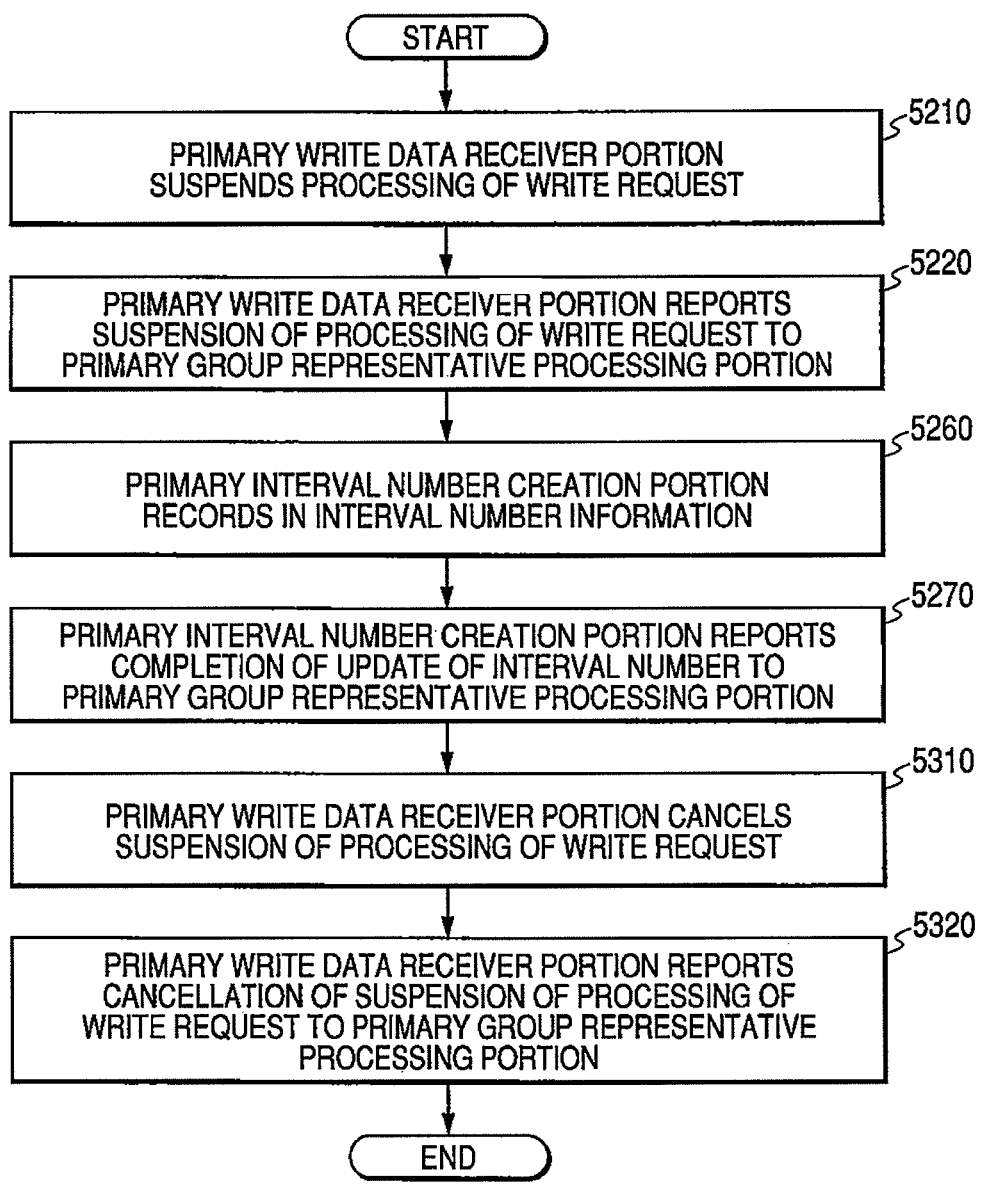
FIG. 21 is a flowchart illustrating one example of processing in which a group representative processing portion instructs a primary storage array controller 1000a-1, 1000a-2 to suspend processing of a write request and to update an interval number especially in cases where the storage array controller has no group representative processing portion.

FIGS. 10 and 21 illustrate one example of processing in which the primary group representative processing portion 1140*a* operating on the I/O control portion 1100*a* instructs the write data receiver portion 1110*a* of the primary storage array controller 1000*a* to suspend the processing of write request and to update the interval number.

FIG. 10 illustrates the processing steps of the above-described processing which are performed by the primary storage array controller 1000*a* in which the primary group representative processing portion 1140*a* is present.

The primary group representative processing portion 1140*a* existing in one of the plural primary storage array controllers 1000*a* refers to the group container management information 1250*a* present in the shared memory 1200*a* and instructs all the primary storage array controllers 1000*a* belonging to the group container to suspend the processing of the write request (step 5200).

The primary group representative processing portion 1140*a* then checks whether it has received reports of starts of suspension of the write request from all the primary storage array controllers 1000*a* belonging to the group container (step 5230).

Where the reports of start of suspension of the write request are received (YES in step 5240), the primary group representative processing portion 1140*a* instructs all the primary storage array controllers 1000*a* belonging to the group container to update the interval number. As a parameter for this instruction, a value is obtained by adding 1 to the interval number specified when the primary group representative processing portion 1140*a* issued the instruction the previous time. This parameter is taken as a new interval number (step 5250).

The primary group representative processing portion 1140*a* checks that reports of the completion of the update of the interval number have been made from all the primary storage array controllers 1000*a* which sent the instruction to update the interval number in step 5250, and then the processing portion 1140*a* goes to next processing (steps 5280 and 5290).

The primary group representative processing portion 1140*a* instructs all the primary storage array controllers 1000*a* belonging to the group container to cancel the suspension of the processing of the write request (step 5300).

The primary group representative processing portion 1140*a* then performs processing for collecting the status of each copy pair from all the primary storage array controllers 1000*a* which sent instructions to update the interval number (step 5330). The procedures of the processing for collecting the status of each copy pair are described later.

In the present processing, processing for collecting copy status of each storage array controller is performed, in addition to the processing for suspending the processing of write requests and giving instructions to update the interval number.

By performing the procedures at regular intervals, the consistency of sets of write data transferred by remote copy technology across plural storage array controllers can be assured.

FIG. 21 is a flowchart illustrating the operation of the write data receiver portion 1110*a* of one primary storage array controller 1000*a*. In this flowchart, the primary group representative processing portion 1140*a* does not need to be contained in its primary storage array controller 1000*a* itself.

The write data receiver portion 1110*a* of each primary storage array controller 1000*a* receives an instruction of suspension of write request from the primary group representative processing portion in step 5200 and suspends the processing of the write request (step 5210). The write data receiver portion 1110*a* informs the primary group representative processing portion 1140*a* that suspension of the write request has been started (step 5220). The address of the primary group representative processing portion 1140*a* is contained in the instruction to suspend the write request. Each primary storage array controller 1000*a* informs the primary group representative processing portion 1140a, using the address, that the write request is suspended.

In step 5250, the interval number creation portion 1130a of each primary storage array controller 1000a receives the instruction to update the interval number from the primary group representative processing portion 1140a and records the received interval number in the group container management information 1250a (step 5260). Furthermore, the interval number creation portion 1130a reports completion of update of the interval number to the primary group representative processing portion 1140a (step 5270).

The interval number contained in the instruction to update the interval number is received in the primary group container management information 1250a, the instruction being received from the primary group representative processing portion 1140a in step 5250. The interval number creation portion 1130a updates the interval number in the group container management information 1250a whenever an instruction to update the interval number is received.

The write data receiver portion 1110a of each primary storage array controller 1000a receives an instruction to cancel the suspension of processing of write request, cancels the suspension of the processing of write request (step 5310), and reports cancellation of the suspension to the primary group representative processing portion 1140a (step 5320).

The processing performed by the write data receiver portion 1110a and primary interval number creation portion 1130a of each primary storage array controller has been described so far. The write data receiver portion 1110a and the primary interval number creation portion 1130a of the primary storage array controller having the primary group representative processing portion exchange information with the primary group representative processing portion inside the same primary storage array controller. The write data receiver portion 1110a and primary interval number creation portion 1130a of the primary storage array controller having no primary group representative processing portion perform communications with the primary group representative processing portion via the communication paths 500.

Figure 11A:
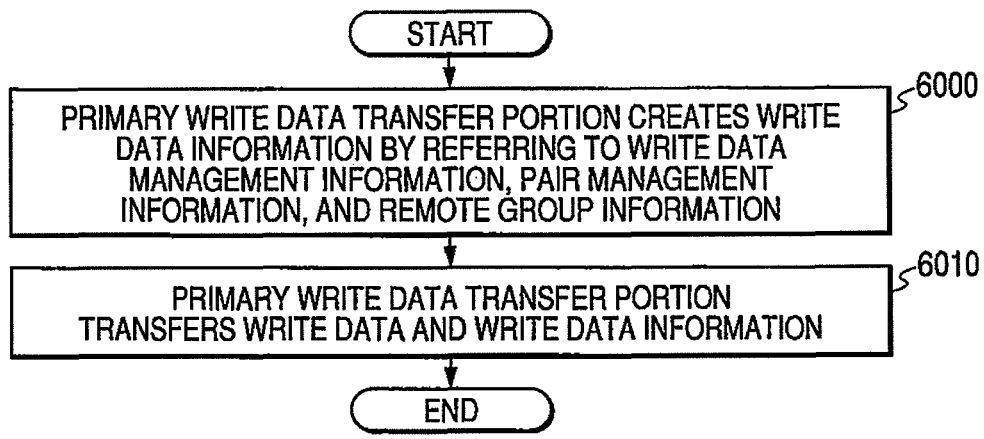
FIGS. 11A and 11B are flowcharts illustrating examples of processing in which a primary storage array controller transfers write data to a secondary storage array controller.
Figure 11B:
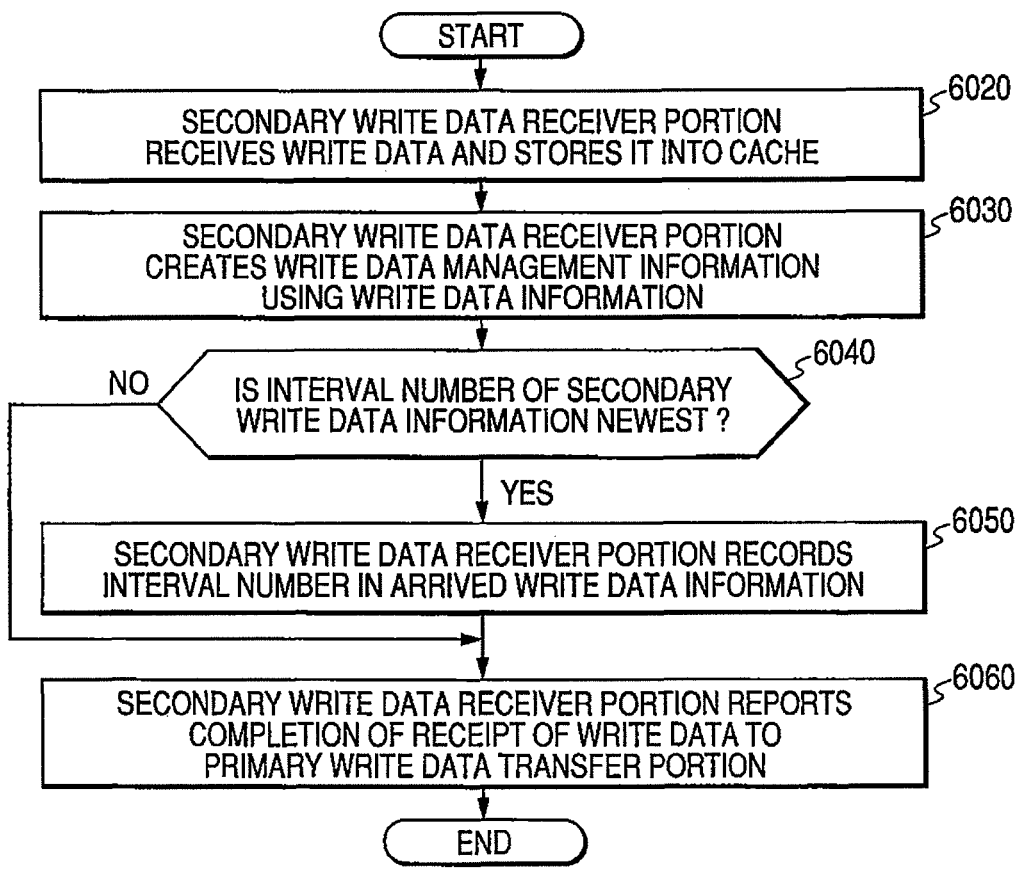

FIGS. 11A and 11B illustrate one example of processing for transferring write data from a primary storage array controller 1000a to a secondary storage array controller 1000b.

First, FIG. 11A illustrates the processing of the primary write data transfer portion 1120a of the primary storage array controller 1000a. The primary write data transfer portion 1120a refers to the write data management information 1220a, finds the write data having the transfer need bit indicating the presence of transfer, and creates write data information by referring to write data management information 1220a, group management information 1210a, and copy pair management information 1230a (step 6000).

The write data information includes write address, write data length, sequential number, and interval number referenced from the write data management information 1220a and remote group ID referenced from the copy pair management information 1230a.

The primary write data transfer portion 1120a then routes the write data identified in step 6000 and write data information read from the shared memory 1200a in step 6000 to the secondary storage array controller 1000b (step 6010).

Figure 16:
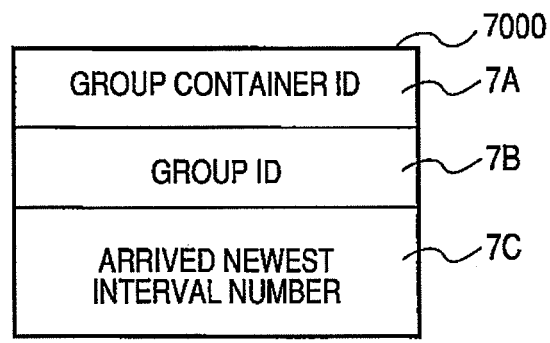
FIG. 16 is a diagram illustrating one example of structure of arrived write data information.

One example of arrived write data information is shown in FIG. 16. The arrived data is write data information transferred from the primary write data transfer portion 1120a to the secondary storage array controller. The arrived write data information 7000 includes group container ID (7A), group ID (7B), and arrived newest interval number group container ID (7C). The group container ID (7A) is an ID for identifying each group container between the primary and secondary storage array controllers. The group ID (7B) is an ID for identifying a group in the secondary storage array controller 1000b within the group container. The arrived newest interval number group container ID (7C) is the greatest value of interval numbers of write data information given to the write data for the copy destination logical volume 1500 belonging to the group indicated by the group ID heretofore received by the write data receiver portion 1110b of the secondary storage array controller 1000b.

FIG. 11B illustrates the flow of processing regarding data received by the secondary write data receiver portion 1110b of the secondary storage array controller 1000b from the primary storage array controller 1000a. The secondary write data receiver portion 1110b inside the secondary write data receiver portion 1110b stores the write data and write data information received by the secondary write data receiver portion 1110b within the controller into the cache memory 1300b (step 6020). Furthermore, the secondary write data receiver portion 1110b creates write data management information 1220b from the write data information (step 6030).

The secondary write data receiver portion 1110b checks whether the interval number contained in the received write data information is newest (step 6040). If it is newest, the interval number is recorded in the arrived write data information 1270b (step 6050).

The write data receiver portion 1110b compares the interval number held as the arrived write data information 1270b and the interval number contained in the received write data information. If the value of the interval number contained in the received write data information is greater, the receiver portion updates the arrived write data information 1270b to this value (step 6050).

Finally, the write data receiver portion 1110b reports completion of reception of the write data to the primary write data transfer portion 1120a (step 6060). The write data transfer portion 1120a receiving the report of completion of the reception of the write data modifies the transfer need bit of the write data management information 1220a to a bit indicating normecessity regarding write data corresponding to report of the completion. The write data can be erased from the cache memory on the condition that the write data has been written in the logical volume 1500 of the transfer destination possessed by the primary storage array controller 1000a.

Figure 12:
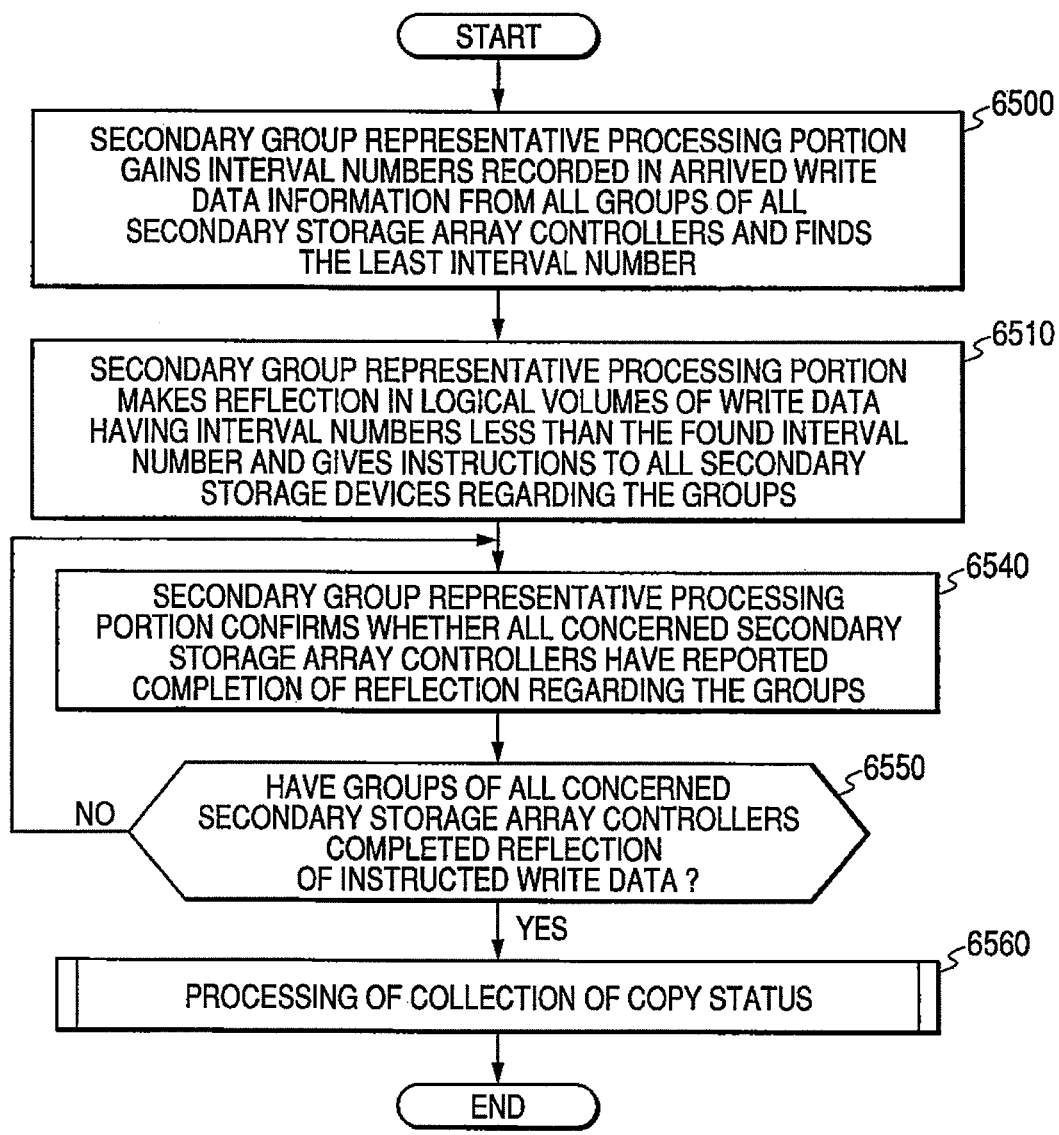
FIG. 12 is a flowchart illustrating one example of processing for reflecting write data in a logical volume of a secondary storage array controller to which a copy is to be transferred.
Figure 22:
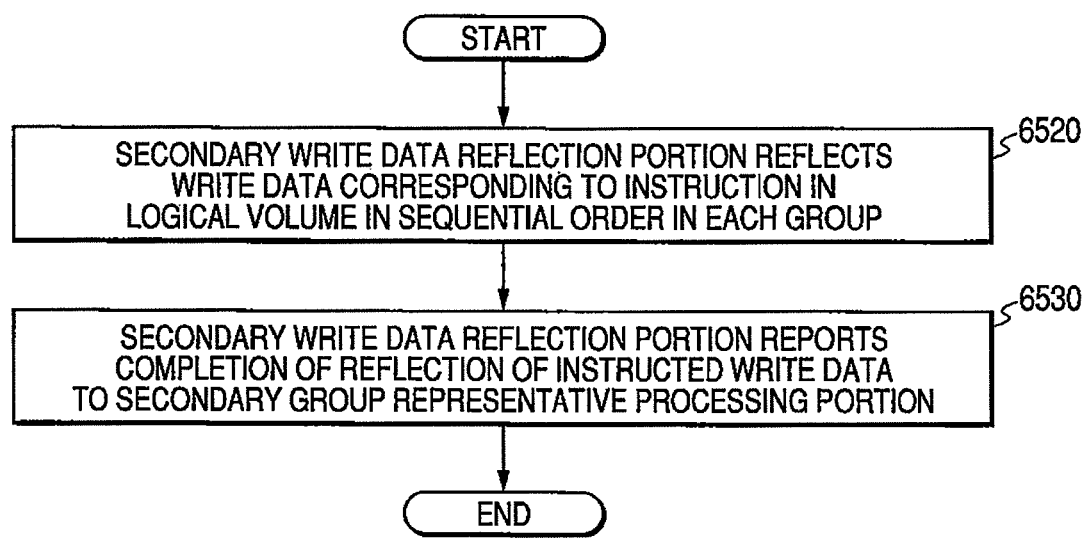
FIG. 22 is a flowchart illustrating one example of processing for reflection of write data in a logical volume of a secondary storage array controller to which a copy is to be transferred especially in cases where the storage array controller has no group representative processing portion.

FIGS. 12 and 22 illustrate one example of processing in which write data is reflected in the logical volume of a copy destination in the secondary storage array controller 1000b.

FIG. 12 illustrates the processing steps of the secondary storage array controller 1000b in which the secondary group representative processing portion 1140b, the processing steps being contained in the processing described above.

The secondary group representative processing portion 1140b existing in one of the plural secondary storage array controllers 1000b gains interval numbers recorded in the arrived write data information 1270b from all the secondary storage array controllers 1000b regarding all the groups. Then, the least interval number of the gained interval numbers is found (step 6500). In addition, the secondary group representative processing portion 1140b instructs all the secondary storage array controllers 1000b to cause write data contained in the write data management information 1220b having interval numbers lower than the numerical value of the interval number found in step 6500 to be reflected in the logical volume of the transfer destination (step 6510).

The secondary group representative processing portion 1140b checks that there is a report of the processing of reflection of the secondary storage array controller 1000b that is a target of a group container in a logical volume of a transfer destination. The secondary group representative processing portion 1140b checks report of the processing of reflection (steps 6540 and 6550). Where completion of reflection of write data in the secondary storage array controller 1000b concerned is confirmed (YES in step 6550), processing for collecting copy statuses is performed (step 6560).

FIG. 22 illustrates processing steps of the secondary storage array controller 1000b having no secondary group representative processing portion 1140b, the processing steps being contained in the above-described processing.

The secondary write data reflection portion 1150 reflects write data in a logical volume 1500 of the transfer destination corresponding to the instruction issued in step 6510 in the sequential order in each group (step 6520). Where the reflection of the instructed write data in the logical volume is complete, the secondary write data reflection portion reports the completion of the reflection to the secondary group representative processing portion 1140b (step 6530).

The processing of the secondary write data receiver portion 1110b in each secondary storage array controller has been described so far. The secondary write data reflection portion 1110b of the secondary storage array controller having the secondary group representative processing portion exchanges information with the secondary group representative processing portion inside the same secondary storage array controller. The secondary write data reflection portion 1110b of the secondary storage array controller having no secondary group representative processing portion performs communications with the secondary group representative processing portion via the communication paths 500.

Figure 13:
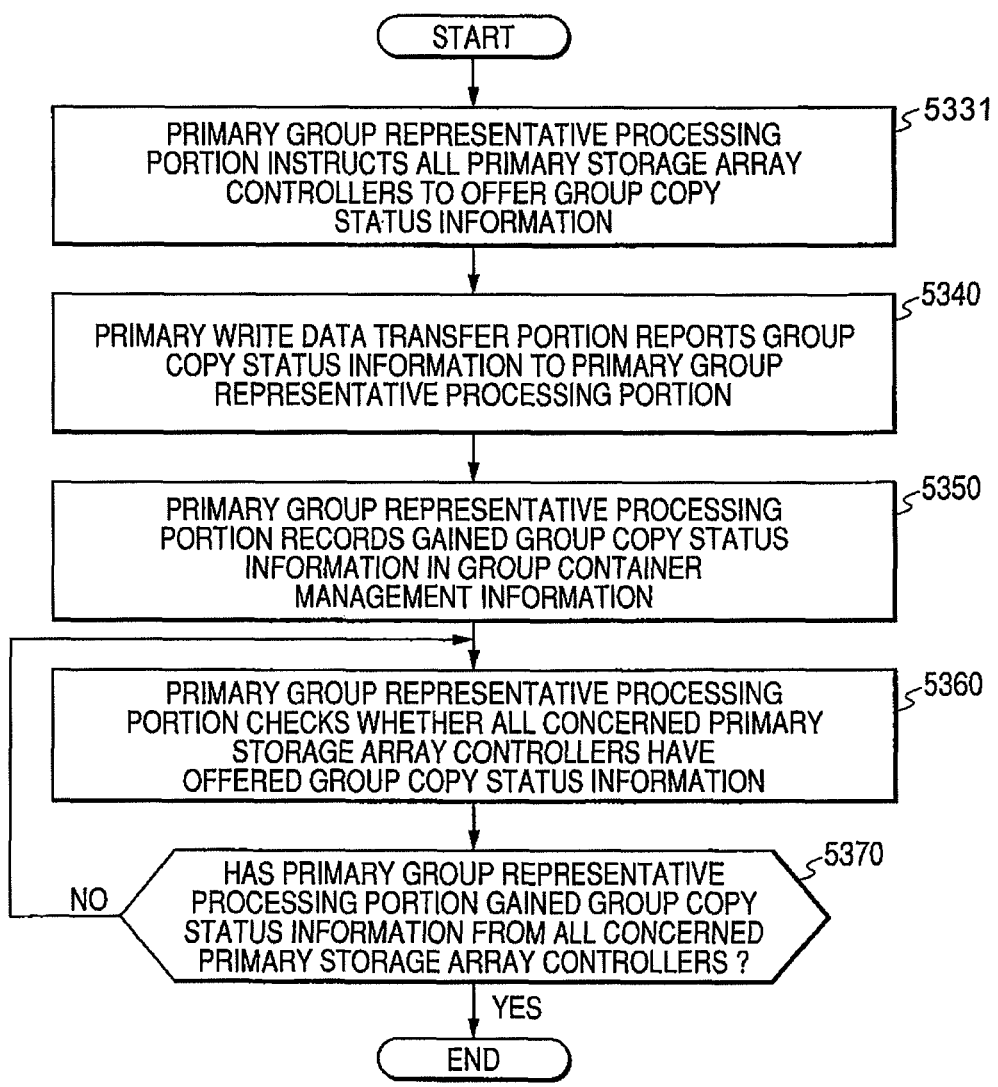
FIG. 13 is a flowchart illustrating processing for implementing a method of collecting copy statuses within a primary storage array controller.

The processing for collecting copy statuses performed by the primary group representative processing portion 1140a is next described in detail. The primary group representative processing portion 1140a performs processing for updating the interval number at regular intervals. Also, the representative processing portion 1140a collects copy statuses of all the primary storage array controllers 1000a present in the group container. The copy status is managed in units of groups by each primary storage array controller 1000a. FIG. 13 illustrates the flow of the processing of the primary storage array controller 1000a having the primary group representative processing portion 1140a.

When the step 5320 illustrated in FIGS. 10 and 21 ends, the primary group representative processing portion 1140a instructs the primary storage array controller 1000a inside the group container to offer group copy status information 1260a (step 5331). The primary write data transfer portion 1120a of the primary storage array controller 1000a receiving the instruction gains the group copy status information 1260a from the shared memory 1200a and makes a report to the primary group representative processing portion 1140a (step 5340).

The primary group representative processing portion 1140a records the gained group copy status information 1260a in the primary group container information within the shared memory 1200a (step 5350). The primary group representative processing portion 1140a gains the group copy status information 1260a from all the primary storage array controllers 1000a which can be contained in the group container, and ends the processing for collecting copy statuses at the instant when the information is recorded in the primary group container information (steps 5360 and 5370). The above-described processing for collecting copy statuses may also be performed among the secondary storage array controllers 1000b.

Storage array controllers where the primary group representative processing portion 1140a does not exist receive instructions from the primary group representative processing portions of the other storage array controllers via the communication paths 500. The primary write data transfer portion 1120a of each primary storage array controller 1000a gains the group copy status information 1260a from the shared memory 1200a and makes a report to the primary group representative processing portions 1140a of the other primary storage array controllers via the communication paths (step 5340).

Similarly to the method shown in FIG. 13 where information is gained from other primary storage array controllers 1000a by the primary group representative processing portion 1140a, the secondary group representative processing portion 1140b performs the processing for collecting copy statuses from the secondary storage array controllers 1000b. Normally, pair states are managed by holding the status of each pair. In the present embodiment, pair status is held as a number of pairs indicating the status. By holding pair statuses in this way, a great compression of status information is enabled.

Figure 15:
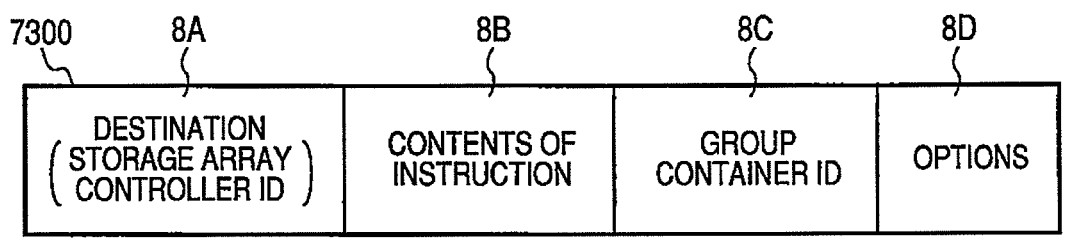
FIG. 15 is a diagram showing one example of an instruction 7300 for storage control.

One example of instruction 7300 for storage control is illustrated in FIG. 15. The instruction for storage control is one kind of I/O request issued by the MF host 100 or OPEN host 200 to each storage array controller 1000. The instruction includes address (8A), instruction contents (8B), group container ID (8C), and options (8D). The address (8A) includes the destinations of I/O requests issued by the MF host 100 and OPEN host 200, the destinations being IDs for identifying the storage array controllers 1000. Contents of instructions for storage control are specified as the instruction contents (8B). The contents of instructions include gaining of the copy status of a group container, group container operations (registration of a group container, deletion of a group container, addition of a group to a group container, and release of a group from a group container), group container copy operations (start of copy, halt of copy, resumption of copy, and release of copy), and group representative processing portion operations (registration of a representative, movement, cancellation, and report of status). IDs for identifying group containers are contained in the group container ID (8C). Optional information for assisting instructions for storage control is specified as the options (8D).

Where the instruction contents (8B) are gaining of the status of group container copy, the storage array controller receiving the instruction reports the group container copy status information 8100.

One example of format of report of the group container copy status information 8100 in the instruction 7300 for storage control is illustrated in FIG. 17. With respect to the report format of the group container copy status information 8100, a combination of any one of address (10A), storage array controller ID (10B), group ID (10C), copy status information (10D), typical error information (10E), subsequent storage array controller ID (10F) and error information (101) is taken as a set of items for one group. The above-described successive units of information correspond to the number of groups which can belong to the group container. The address (10A) contains a responder host ID. The storage array controller ID (10B) contains an ID for identifying a storage array controller. The group ID (10C) contains an ID for identifying a group existing within the storage array controller indicated by the storage array controller ID (10B). The copy status information (10D) contains a number of copy pairs recorded to indicate what copy status does the copy pair in the group assume. Error information regarding copy produced within the group is recorded in the typical error information (10E). A typical error is error information produced within the latest time. In this embodiment, the pieces of information from the storage array controller ID (10B) to the typical error information (10I) have the same contents as the group information (1D) of the primary group container management information 1250a stored in the shared memory 1200a inside the primary storage array controller 1000a. Also, the status information of the group information (1D) has the same contents as the group copy status information 1260a. The group representative processing portion 1140a records group copy status information 1260a collected regularly in the primary group container management information 1250a and refers to the primary group container management information 1250a according to the instruction for storage control (report of status information), whereby it can create and offer copy status information.

In order for the MF host 100a and OPEN host 200a to gain the copy status collected in the primary storage array controller 1000a, either the MF host 100a or OPEN host 200a that can gain access to the primary storage array controller 1000a on which the primary group representative processing portion 1140a operates issues instruction 7300 for storage control to gain copy status. The host that issues the instruction 7300 for storage control is hereinafter referred to as a representative host.

When the primary storage array controller 1000a receives the instruction 7300 for storage control from a host, the primary write data receiver portion 1110a receives the instruction and transfers it to the primary group representative processing portion 1140a except for the processing for gaining copy status. Processing corresponding to the instruction for control received by the primary group representative processing portion 1140a is carried out.

After end of the processing corresponding to the instruction, the primary group representative processing portion 1140a responds to the host issuing the instruction for storage control that the processing is complete via the primary write data receiver portion 1110a. In the case of the processing for gaining copy status, the primary write data receiver portion 1110a responds to the host issuing the instruction for storage control that the processing is complete.

After gaining the group container copy status information 8100, the representative host gaining the information judges the copy status. To judge the copy status, a decision table 8200 for judging the copy status of the group is used. One example of the decision table 8200 for judging the copy status of group is shown in FIG. 18. In the vertical direction of the decision table 8200 for judging the copy status of group, the copy status of group is shown. In the horizontal direction, combinations of group container copy status information gained from the storage array controllers are shown.

Figure 14:
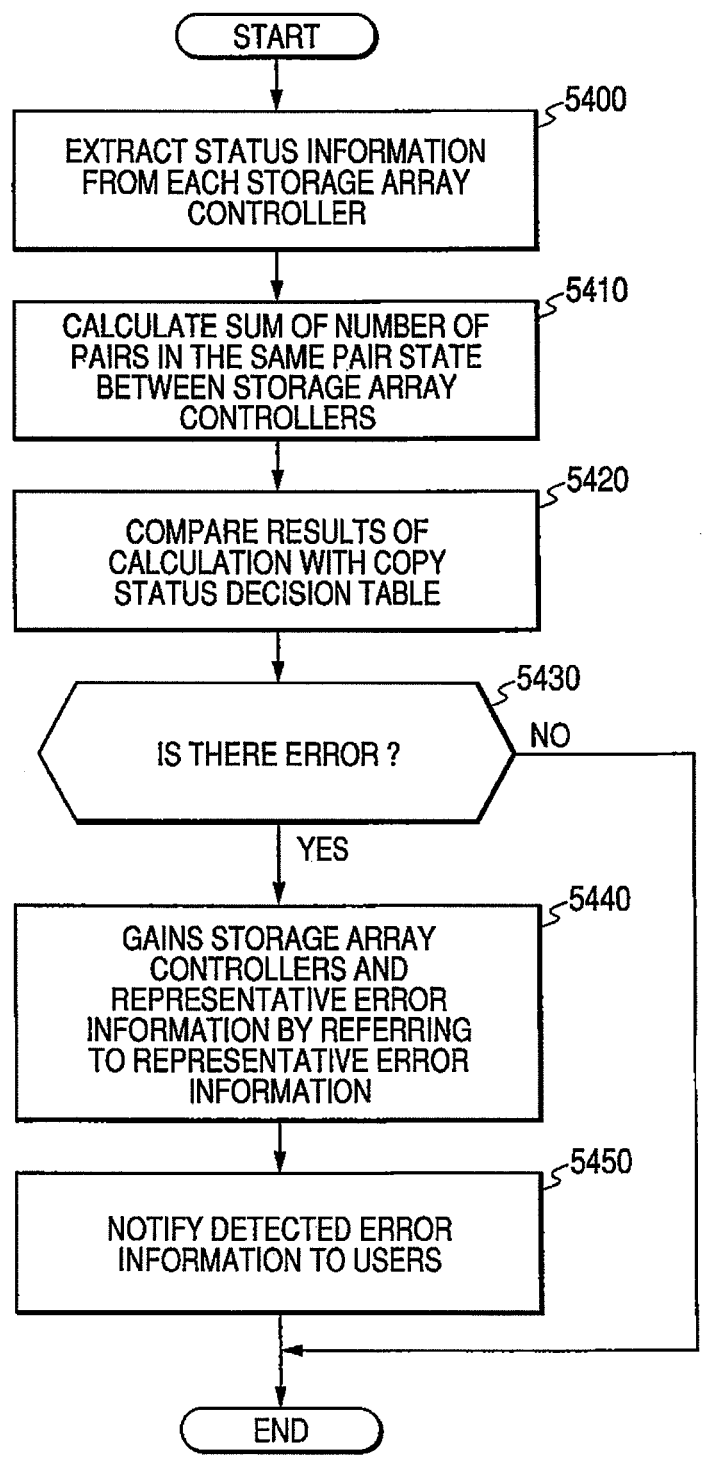
FIG. 14 is a flowchart illustrating processing for collecting and judging copy statuses by a host computer.

Processing for judging the copy status is next described using the flowchart of FIG. 14. A representative host extracts status information (10H) about each storage array controller and typical error information (10E) from the gained group container copy status information 8100 (step 5400). Then, the representative host classifies the extracted status information about the storage array controllers in terms of copy pair status and adds up the number of pairs in the same copy pair status (step 5410). After the calculation, the result of the calculation made in step 5410 and the numbers put in the copy status decision table 8200 are compared (step 5420).

Where the result of the comparison indicates that the copy pair status is not error (sum of error/no error is 0) (NO in step 5430), the status put in the column of the copy status decision table 8200 showing a coincidence becomes the copy status of the group container. Processing of the decision is ended.

Where the copy pair status is error (sum of error/no error is 1 or more) (YES in step 5430), the group container copy status information 8100 is again referenced. A storage array controller 1000a having the typical error information (101) whose error/no error is "error" is identified. Furthermore, the typical error code of the typical error information (101) of the storage array controller 1000a whose error/no error is "error" is gained (step 5440). The representative host notifies the error information (storage array controller and its typical error code) to the operator (user) of the representative host (step 5450).

By analyzing the notified error information, the user can identify which of the copy pairs in the group of a certain storage array controller 1000a registered in the group container is at fault. Furthermore, it is possible to identify that the fault is a fault kind indicated by an error code. The user who has received a notice of error information identifies the details of the fault using other means. For this purpose, the user does work consisting of checking the status of a certain pair or consisting of checking the status of the storage array controller 1000a. Since the work makes it possible to limit storage array controllers or fault kinds to be checked, the users amount of work can be made much smaller than the prior art work for checking faults.

Remote copy operations use group container copy operations and group container operations. First, a group container is created by a group container operation (registration). Then, a copy group is added to the group container by a group container operation. After registering the copy group in the group container, a remote copy operation is performed by a group container copy operation.

With respect to the remote copy operations, remote copy operations over the whole group container across plural storage array controllers can be performed by causing one storage array controller 1000 to receive the instruction 7300 for storage control including remote copy operations issued by the representative host and causing the group representative processing portion operating on the primary storage array controller 1000a to transfer the operations to other storage array controller 1000 using communication path 530, in the same way as in the processing for collecting copy status illustrated in FIG. 13.

Each storage array controller 1000 performs copy processing according to the contents of instruction (8B) of the instruction 7300 for storage control. Where the instruction contents are start of copy, the primary write data receiver portion 1110a registers all of copy pair management information 1230 according to the contents of description in the storage control instruction 7300. Note that, however, copy status (5B) of the copy pair management information 1230 is registered as "during copy". Furthermore, the primary write data receiver portion 1110a registers copy information in pair number (6D), group ID (6F), and group container ID (6G) of the volume management information 1240 according to the contents of description in the above-described I/O request. Then, processing for copying the data is started. After bringing the contents of the volume of the corresponding copy source into agreement with the contents of the volume of the copy destination, the primary write data receiver portion 1110a duplexes the copy status (5B) of the copy pair management information 1230.

Where the contents of the instruction indicate suspension, the primary write data receiver portion 1110a suspends the copy status (5B) of the copy pair management information 1230 and performs procedures for suspending the processing for copy pair. After the end of procedures for suspending the copy pair, the copy status (5B) is suspended.

In some cases, storage array controllers that can be controlled from the MF host 100a and OPEN host 200a are restricted. In such cases, it is necessary that the group representative processing portion 1140a can be processed by any arbitrary storage array controller. In these cases, the group representative processing portion operations of the instruction 7300 for storage control are used.

For example, if it is desired that the group representative processing portion 1140a be executed for one primary storage array controller 1000a, the representative host issues an I/O request including an instruction 7300 for storage control to the primary storage array controller 1000a, the contents of the instruction 7300 being group representative processing portion operations (registration). The storage array controller receiving the instruction initiates the group representative processing.

As described so far, in the present embodiment, in a remote copy process across plural storage array controllers, to assure consistency, the group representative processing portion in one primary storage array controller performs processing for inserting time intervals into data to be transferred by remote copy for plural primary storage array controllers registered as subjects of remote copy. After the processing for inserting the time intervals for the plural primary storage array controllers, the instruction 7300 for storage control is also distributed. Consequently, the status of remote copy across the plural storage array controllers can be gained from one storage array controller. In addition, remote copy operations across the plural storage array controllers can be performed.

What is claimed is:

1. A computer system comprising:
   a first storage system having a plurality of first storage areas capable of storing data used by a first host computer via a first communication line, a first control portion connected with a plurality of disk units forming the first storage areas, and a first memory connected with the first control portion;
   a second storage system having a plurality of second storage areas capable of storing data used by a second host computer via a second communication line and a second control portion connected with disk units forming the second storage areas, the second storage system being connected with the first storage system via a third communication line;
   a third storage system connected with the first storage system via a fourth communication line, having a plurality of third storage areas for storing copy of data stored in the first storage areas of the first storage system; and
   a fourth storage system connected with the second storage system via a fifth communication line and with the third storage system via a sixth communication line, having a plurality of fourth storage areas for storing copy of data stored in the second storage areas of the second storage system,
   wherein the first control portion controls access from the first host computer to the data stored in the first storage areas and transmission of the copy of data stored in the first storage areas to the third storage system via the fourth communication line, in which the first and the third storage areas are formed as a first pair relation,
   wherein the second control portion controls access from the second host computer to data stored in the second storage areas and transmission of the copy of data stored in the second storage areas to the fourth storage system via the fifth communication line, in which the second and the fourth storage areas are formed as a second pair relation,
   wherein the first control portion manages the first pair relation and the second pair relation as a first group,
   wherein the first control portion gains first status information of the first pair relation, issues a request of second status information of the second pair relation to the second storage system, gains the second status information from the second storage system, and holds the first status information and the second status information as group status information in the first memory,
   wherein the first control portion sends the group status information to the first host computer, when the first control portion receives a request of gaining the group status information from the first host computer,
   wherein the group status information is an information table in which status of each pair registered in a group is indicated by a number of pairs of each status,
   wherein, when a fault occurs during copy, the group status information includes error information produced within the first group at a latest time,
   wherein said first host computer after gaining the group status information judges status of the first group by use of the group status information, and
   wherein processing for judging the status of the first group includes:
      extracting the first or second status information about each storage system and error information from the gained group status information,
      wherein status which indicates a fault that occurs during copy is included in the extracted status information,
      referencing the group status information,
      identifying a storage system having the error information,
      gaining the error information of the storage system,
      displaying the error information including information which indicates the storage system in which a fault occurs, and
      ending processing.

2. A computer system according to claim 1, wherein the first storage system totalizes a plurality of the group status information by using an identifier related to a time interval of remote copy, and sends the plurality of group status information to the first host computer.

3. A computer system according to claim 1, wherein a third pair relation is formed by the second storage areas and the third storage areas, and wherein a second group is formed by the first pair relation and the third pair relation.

4. A computer system according to claim 1, wherein a third group is formed by the first pair relation, the second pair relation, and the third pair relation.

5. A computer system according to claim 3, wherein the first storage system manages the first and the second group by using identifier of each group.

6. A computer system according to claim 1,
   wherein the first storage system receives an instruction indicating a suspension issued from the first computer, and transfer the instruction to said second storage system, and
   wherein the first storage system and the second storage system perform suspending copy statuses of the first pair relation and the second pair relation.

7. A method of managing status by a computer system including a first storage system having a plurality of first storage areas capable of storing data used by a first host computer via a first communication line, a first control portion connected with a plurality of disk units forming the first storage areas, and a first memory connected with the first control portion, a second storage system having a plurality of second storage areas capable of storing data used by a second host computer via a second communication line and a second control portion connected with disk units forming the second storage areas, the second storage system being connected with the first storage system via a third communication line, a third storage system connected with the first storage system via a fourth communication line, having a plurality of third storage areas for storing copy of data stored in the first storage areas of the first storage system, and a fourth storage system connected with the second storage system via a fifth communication line and with the third storage system via a sixth communication line, having a plurality of fourth storage areas for storing copy of data stored in the second storage areas of the second storage system, said method comprising the steps of:

controlling, by the first control portion, access from the first host computer to the data stored in the first storage areas and transmission of the copy of data stored in the first storage areas to the third storage system via the fourth communication line, in which the first and the third storage areas are formed as a first pair relation;

controlling, by the second control portion, access from the second host computer to data stored in the second storage areas and transmission of the copy of data stored in the second storage areas to the fourth storage system via the fifth communication line, in which the second and the fourth storage areas are formed as a second pair relation;

managing, by the first control portion, the first pair relation and the second pair relation as a first group;

by the first control portion, gaining first status information of the first pair relation, issuing a request of second status information of the second pair relation to the second storage system, gaining the second status information from the second storage system, and holding the first status information and the second status information as group status information in the first memory;

sending, by the first control portion, the group status information to the first host computer, when the first control portion receives a request of gaining the group status information from the first host computer, wherein the group status information is an information table in which status of each pair registered in a group is indicated by a number of pairs of each status, and wherein, when a fault occurs during copy, the group status information includes error information produced within the first group at a latest time; and judging, by said first host computer, after gaining the group status information, status of the first group by use of the group status information, wherein the judging the status of the first group step includes the steps of:

extracting the first or second status information about each storage system and error information from the gained group status information, wherein status which indicates a fault that occurs during copy is included in the extracted status information, referencing the group status information, identifying a storage system having the error information, gaining the error information of the storage system, displaying the error information including information which indicates the storage system in which a fault occurs, and ending processing.

8. A method according to claim 7, wherein the first storage system totalizes a plurality of the group status information by using an identifier related to a time interval of remote copy, and sends the plurality of group status information to the first host computer.

9. A method according to claim 7, wherein a third pair relation is formed by the second storage areas and the third storage areas, and wherein a second group is formed by the first pair relation and the third pair relation.

10. A method according to claim 7, wherein a third group is formed by the first pair relation, the second pair relation, and the third pair relation.

11. A method according to claim 9, wherein the first storage system manages the first and the second group by using identifier of each group.

12. A non-transitory computer readable storage medium having stored therein a computer program for managing status by a computer system including a first storage system having a plurality of first storage areas capable of storing data used by a first host computer via a first communication line, a first control portion connected with a plurality of disk units forming the first storage areas, and a first memory connected with the first control portion, a second storage system having a plurality of second storage areas capable of storing data used by a second host computer via a second communication line and a second control portion connected with disk units forming the second storage areas, the second storage system being connected with the first storage system via a third communication line, a third storage system connected with the first storage system via a fourth communication line, having a plurality of third storage areas for storing copy of data stored in the first storage areas of the first storage system, and a fourth storage system connected with the second storage system via a fifth communication line and with the third storage system via a sixth communication line, having a plurality of fourth storage areas for storing copy of data stored in the second storage areas of the second storage system, said computer program when executed causes the computer system to perform the steps of:

controlling, by the first control portion, access from the first host computer to the data stored in the first storage areas and transmission of the copy of data stored in the first storage areas to the third storage system via the fourth communication line, in which the first and the third storage areas are formed as a first pair relation;

controlling, by the second control portion, access from the second host computer to data stored in the second storage areas and transmission of the copy of data stored in the second storage areas to the fourth storage system via the fifth communication line, in which the second and the fourth storage areas are formed as a second pair relation;

managing, by the first control portion, the first pair relation and the second pair relation as a first group;

by the first control portion, gaining first status information of the first pair relation, issuing a request of second status information of the second pair relation to the second storage system, gaining the second status information from the second storage system, and holding the first status information and the second status information as group status information in the first memory;

sending, by the first control portion, the group status information to the first host computer, when the first control portion receives a request of gaining the group status information from the first host computer, wherein the group status information is an information table in which status of each pair registered in a group is indicated by a number of pairs of each status, and wherein, when a fault occurs during copy, the group status information includes error information produced within the first group at a latest time; and judging, by said first host computer, after gaining the group status information, status of the first group by use of the group status information, wherein the judging the status of the first group step includes the steps of:
  extracting the first or second status information about each storage system and error information from the gained group status information, and
  wherein status which indicates a fault that occurs during copy is included in the extracted status information,
  referencing the group status information,
  identifying a storage system having the error information, gaining the error information of the storage system,
  displaying the error information including information which indicates the storage system in which a fault occurs, and
  ending processing.

13. A non-transitory computer readable storage medium according to claim 12, wherein the first storage system totalizes a plurality of the group status information by using an identifier related to a time interval of remote copy, and sends the plurality of group status information to the first host computer.

14. A non-transitory computer readable storage medium according to claim 12, wherein a third pair relation is formed by the second storage areas and the third storage areas, and wherein a second group is formed by the first pair relation and the third pair relation.

15. A non-transitory computer readable storage medium according to claim 12, wherein a third group is formed by the first pair relation, the second pair relation, and the third pair relation.

16. A non-transitory computer readable storage medium according to claim 14, wherein the first storage system manages the first and the second group by using identifier of each group.

17. A non-transitory computer readable storage medium according to claim 12,
  wherein the first storage system receives an instruction indicating a suspension issued from the first computer, and transfer the instruction to said second storage system, and
  wherein the first storage system and the second storage system perform suspending copy statuses of the first pair relation and the second pair relation.

* * * * *